(12) United States Patent
Toriumi et al.

(10) Patent No.: US 7,327,341 B2
(45) Date of Patent: Feb. 5, 2008

(54) DISPLAY DRIVER, DISPLAY DEVICE, AND DISPLAY DRIVE METHOD

(75) Inventors: Yuichi Toriumi, Chino (JP); Akira Morita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 694 days.

(21) Appl. No.: 10/760,518

(22) Filed: Jan. 21, 2004

(65) Prior Publication Data

US 2004/0233226 A1 Nov. 25, 2004

(30) Foreign Application Priority Data

Jan. 31, 2003 (JP) ............................ 2003-023669

(51) Int. Cl.
*G09G 3/36* (2006.01)
*G09G 5/00* (2006.01)
*G06F 3/038* (2006.01)

(52) U.S. Cl. ........................................ 345/98; 345/212

(58) Field of Classification Search .................. 345/87, 345/98, 99, 100, 204, 208, 690
See application file for complete search history.

(56) References Cited

U.S. PATENT DOCUMENTS 6,791,539 B2 * 9/2004 Nakajima et al. ........... 345/204
7,239,742 B2 * 7/2007 Ohtani et al. ............... 382/162
2002/0190973 A1 12/2002 Morita
2002/0190974 A1 * 12/2002 Morita ....................... 345/208

FOREIGN PATENT DOCUMENTS

| | | |
|---|---|---|
| CN | 87 1 06310 A | 3/1988 |
| EP | 0 262 714 A1 | 4/1988 |
| JP | A 7-175435 | 7/1995 |
| JP | A 11-184434 | 7/1999 |
| JP | A 2002-351412 | 12/2002 |
| JP | A 2002-351413 | 12/2002 |

* cited by examiner

*Primary Examiner*—Amr A. Awad
*Assistant Examiner*—Steven E Holton
(74) *Attorney, Agent, or Firm*—Oliff & Berridge, PLC

(57) ABSTRACT

A display driver includes a front drawing row designation register, a partial mode setting register, a data line driver circuit having an operational amplifier section and a partial non-display voltage output section, and a partial display control section. The front drawing row designation register is a register for designating one of the scanning lines corresponding to a front drawing row. The partial mode setting register is a register which sets for the scanning lines either a normal display mode in which a drive voltage depending on gray-scale data is supplied to at least one of the data lines, or a partial non-display mode in which a partial non-display voltage is supplied to at least one of the data lines. The operational amplifier section drives at least one of the data lines based on the drive voltage. The partial non-display voltage output section drives at least one of the data lines based on the partial non-display voltage. The partial display control section controls the data line driver circuit.

26 Claims, 19 Drawing Sheets

DISPLAY DRIVER, DISPLAY DEVICE, AND DISPLAY DRIVE METHOD

Japanese Patent Application No. 2003-23669, filed on Jan. 31, 2003 is hereby incorporated by reference in its entirety.

BACKGROUND OF THE INVENTION

The present invention relates to a display driver, a display device, and a display drive method.

A display panel (display device in a broad sense) represented by a liquid crystal display (LCD) panel is mounted on portable telephones and personal digital assistants (PDAs). Reduction of power consumption is strongly demanded for a display panel mounted on these electronic instruments.

As a measure to realize reduction of power consumption of a display panel, a partial display has been proposed. The partial display allows only a part of the display area of the display panel to be displayed, thereby reducing power consumption in the non-display area.

BRIEF SUMMARY OF THE INVENTION

According to one aspect of the present invention, there is provided a display driver which drives a plurality of data lines arranged in columns, the data lines intersecting a plurality of scanning lines arranged in rows, and the display driver comprising:

a front drawing row designation register which designates one of the scanning lines as a front drawing row;

a partial mode setting register which sets for the scanning lines either a normal display mode in which a drive voltage depending on gray-scale data is supplied to at least one of the data lines, or a partial non-display mode in which a partial non-display voltage is supplied to at least one of the data lines;

a data line driver circuit including an operational amplifier section which drives at least one of the data lines based on the drive voltage, and a partial non-display voltage output section which drives at least one of the data lines based on the partial non-display voltage; and a partial display control section which controls driving of the data line driver circuit, wherein, when part of the scanning lines which are drawing rows including the front drawing row are set to the normal display mode, the partial display control section drives at least one of the data lines by using the operational amplifier section based on the drive voltage, in a select period of the scanning lines; and wherein, when part of the scanning lines which are the drawing rows are set to the partial non-display mode, the partial display control section limits or stops an operating current of the operational amplifier section, and drives at least one of the data lines by using the partial non-display voltage output section based on the partial non-display voltage, in a select period of the scanning lines.

According to another aspect of the present invention, there is provided a display drive method which drives a plurality of data lines arranged in columns, the data lines intersecting a plurality of scanning lines arranged in rows, and the display driver comprising:

designating one of the scanning lines as a front drawing row;

driving at least one of the data lines by using an operational amplifier section based on a drive voltage, in a select period of the scanning lines, when part of the scanning lines which are drawing rows including the front drawing row are set to a normal display mode; and limiting or stopping an operating current of the operational amplifier section, and driving at least one of the data lines by using a partial non-display voltage output section based on a partial non-display voltage, in a select period of the scanning lines, when part of the scanning lines which are the drawing rows are set to a partial non-display mode.

DETAILED DESCRIPTION OF THE EMBODIMENTS

Figure 1:
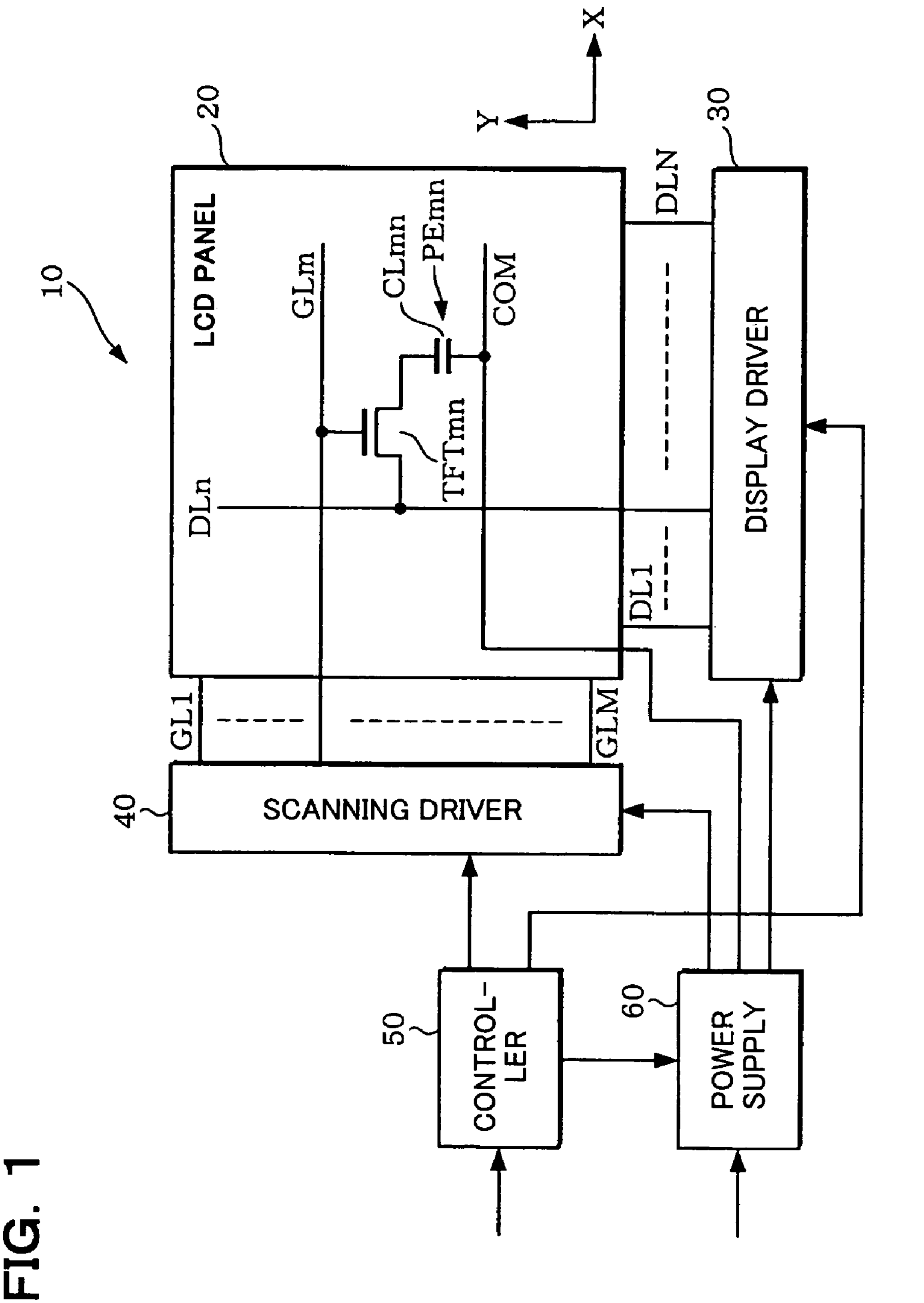
FIG. 1 is a block diagram showing a display device according to one embodiment of the present invention.

Embodiments of the present invention are described below. Note that the embodiments described hereunder do not in any way limit the scope of the invention defined by the claims laid out herein. Note also that all of the elements described below should not be taken as essential requirements for the present invention.

The above-described partial display is realized by using various methods. It is desirable that the partial display be realized by using a method which allows the mounting area determined by the location relationship between a display panel mounted on an electronic instrument and a display driver which drives the display panel to be reduced.

The following description is given on the assumption that an LCD panel includes a plurality of scanning lines disposed in parallel in a Y direction (direction in which rows are arranged), and a plurality of data lines disposed in parallel in an X direction (direction in which columns are arranged) perpendicular to the Y direction. In order to optimize the mounting of the LCD panel, the partial display (horizontal partial display) is realized by using a display driver which does not include a display memory (simple LCD driver) so that a partial display area and a partial non-display area are provided in the Y direction, for example.

A display driver which includes a display memory can store display data for one frame in the display memory, for example. Therefore, the display driver can drive the LCD panel while acquiring information on the vertical scanning direction and the horizontal scanning direction. Therefore, such a display driver drives the data line based on the display data only in the horizontal scanning period of the partial display area.

A display driver which does not include a display memory has only the display data for one horizontal scanning period. Therefore, it is necessary to provide an additional circuit which acquires information on the vertical scanning direction, such as the row of the LCD panel being drawn. Therefore, the simple LCD driver realizes the partial display by detecting the current drawing rows and determining either the partial display area or the partial non-display area.

However, the start timing of the first row differs, depending on the LCD panel mounted on an electronic instrument. For example, the first row of a scanning driver which drives the LCD panel is not necessarily the display area depending on the LCD panel. In this case, a shift occurs in the image displayed on the LCD panel.

A dedicated controller supplies the display data to the display driver in row units. However, a general-purpose controller does not have the function of realizing a partial display. Therefore, it is desirable to realize the above-described function by the display driver, since it is desirable that the display driver be connected with a general-purpose controller.

According to the following embodiments, a display driver which can be controlled by using a general-purpose controller and realizes a horizontal partial display function while recognizing the drawing rows depending on the display panel, a display device, and a display drive method can be provided.

The embodiments of the present invention are described below in detail with reference to the drawings.

1. Display Device

FIG. 1 schematically shows the configuration of a display device according to one embodiment of the present invention. A liquid crystal device is shown in this figure as an example of the display device. A liquid crystal device may be incorporated in various electronic instruments such as a portable telephone, portable information instrument (PDA, etc.), digital camera, projector, portable audio player, mass storage device, video camera, electronic notebook, or global positioning system (GPS).

In FIG. 1, a liquid crystal device 10 includes an LCD panel (display panel in a broad sense; electro-optical device in a broader sense) 20, a display driver (source driver or column driver circuit) 30, a scanning driver (gate driver or row driver circuit) 40, a controller (display controller) 50, and a power supply circuit 60. The liquid crystal device 10 may also be called an electro-optical device.

The liquid crystal device 10 does not necessarily include all of these circuit blocks. The liquid crystal device 10 may have a configuration in which some of these circuit blocks are omitted.

The LCD panel 20 includes a plurality of scanning lines (gate lines), each of the scanning lines being provided for each row, a plurality of data lines (source lines) which intersect the scanning lines, each of the data lines being provided for each column, and a plurality of pixels, each of the pixels being specified by one of the scanning lines and one of the data lines. Each of the pixels includes a thin film transistor (hereinafter abbreviated as "TFT") and a pixel electrode. The TFT is connected with the data line, and the pixel electrode is connected with the TFT.

In more detail, the LCD panel 20 is formed on a panel substrate formed of a glass substrate, for example. A plurality of scanning lines GL1 to GLM (M is an integer of two or more; M is preferably three or more), arranged in the Y direction shown in FIG. 1 and extending in the X direction, and a plurality of data lines DL1 to DLN (N is an integer of two or more), arranged in the X direction and extending in the Y direction, are disposed on the panel substrate. A pixel PEmn is disposed at a location corresponding to the intersecting point of the scanning line GLm ($1 \leqq m \leqq M$, m is an integer) and the data line DLn ($1 \leqq n \leqq N$, n is an integer). The pixel PEmn includes the TFTmn and the pixel electrode.

A gate electrode of the TFTmn is connected with the scanning line GLm. A source electrode of the TFTmn is connected with the data line DLn. A drain electrode of the TFTmn is connected with the pixel electrode. A liquid crystal capacitor CLmn is formed between the pixel electrode and a common electrode COM which faces the pixel electrode through a liquid crystal element (electro-optical material in a broad sense). A storage capacitor may be formed in parallel with the liquid crystal capacitor CLmn. Transmissivity of the pixel changes corresponding to the voltage applied between the pixel electrode and the common electrode COM. A voltage VCOM supplied to the common electrode COM is generated by the power supply circuit 60.

The LCD panel 20 is formed by attaching a first substrate on which the pixel electrode and the TFT are formed to a second substrate on which the common electrode is formed, and sealing a liquid crystal as an electro-optical material between the two substrates.

The display driver 30 is a simple LCD driver. Specifically, the display driver 30 does not include a display memory which stores display data for one frame, for example, and drives the data lines DL1 to DLN of the LCD panel 20 based on display data for one horizontal scanning period supplied in units of horizontal scanning periods. In more detail, the display driver 30 drives at least one of the data lines DL1 to DLN based on the display data.

The scanning driver 40 scans the scanning lines GL1 to GLM of the LCD panel 20. In more detail, the scanning driver 40 consecutively selects the scanning lines GL1 to GLM in one vertical period, and drives the selected scanning line.

The controller 50 outputs control signals to the display driver 30, the scanning driver 40, and the power supply circuit 60 according to the contents set by a host such as a central processing unit (CPU) (not shown). In more detail, the controller 50 supplies an operation mode setting and a horizontal synchronization signal or a vertical synchronization signal generated therein to the display driver 30 and the scanning driver 40, for example. The horizontal synchronization signal specifies the horizontal scanning period. The vertical synchronization signal specifies the vertical scanning period. The controller 50 controls the power supply circuit 60 relating to polarity reversal timing of the voltage VCOM applied to the common electrode COM by using a polarity reversal signal POL.

The power supply circuit 60 generates various voltages applied to the LCD panel 20 and the voltage VCOM applied to the common electrode COM based on a reference voltage supplied from the outside.

In FIG. 1, the liquid crystal device 10 includes the controller 50. However, the controller 50 may be provided outside the liquid crystal device 10. The host (not shown) may be included in the liquid crystal device 10 together with the controller 50.

At least one of the scanning driver 40, the controller 50, and the power supply circuit 60 may be included in the display driver 30.

Figure 2:
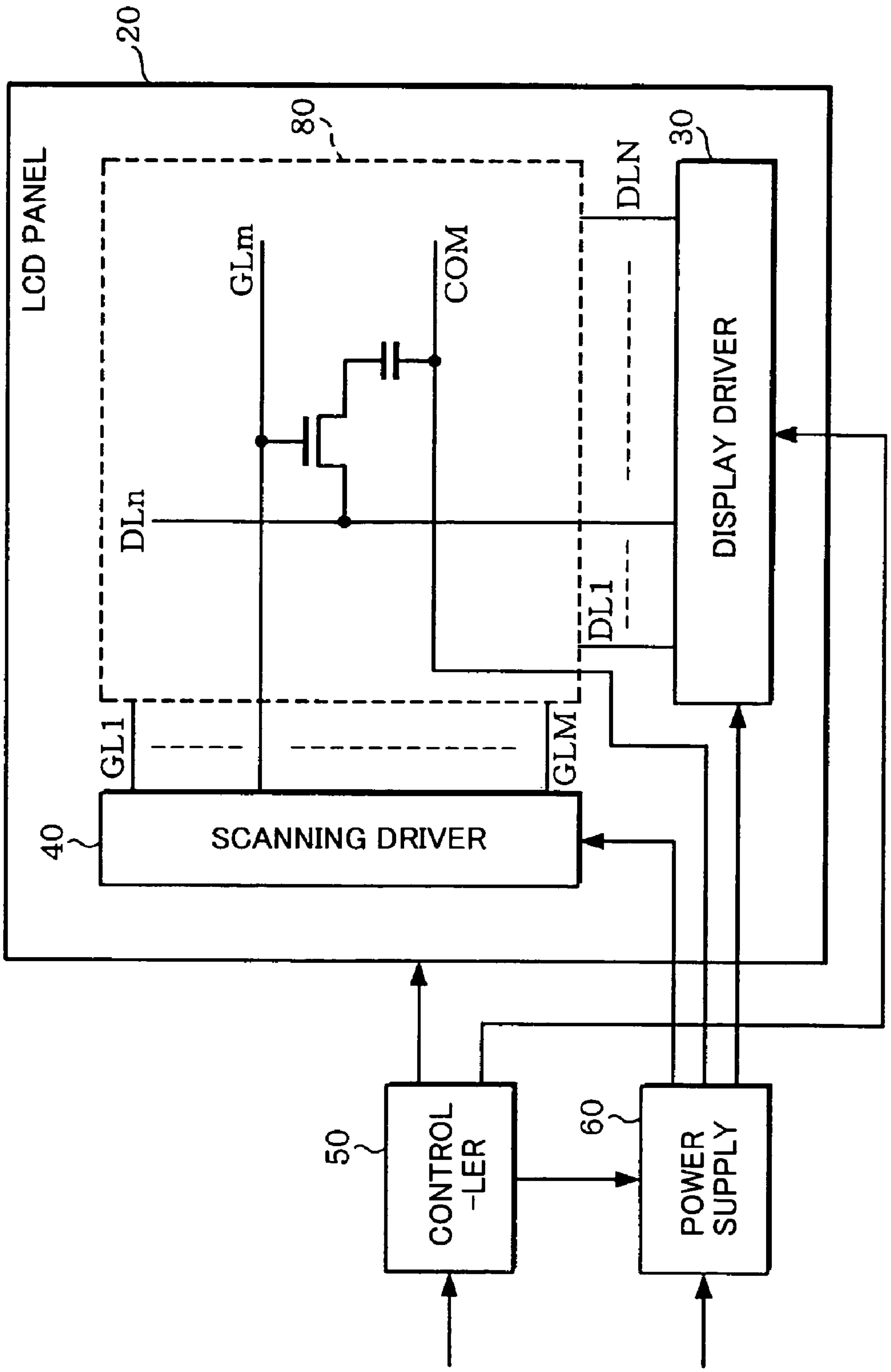
FIG. 2 is a block diagram showing a display device according to another embodiment of the present invention.

Some or all of the display driver 30, the scanning driver 40, the controller 50, and the power supply circuit 60 may be formed on the LCD panel 20. In FIG. 2, the display driver 30 and the scanning driver 40 are formed on the LCD panel 20. As described above, the LCD panel 20 can be formed to include the data lines, the scanning lines, the pixels, each of which is specified by one of the data lines and one of the scanning lines, and the display driver which drives the data lines. The pixels are formed in a pixel formation region 80 of the LCD panel 20.

2. Horizontal Partial Display (Partial Display)

The display driver 30 in this embodiment has a horizontal partial display function (partial display function).

Figure 3:
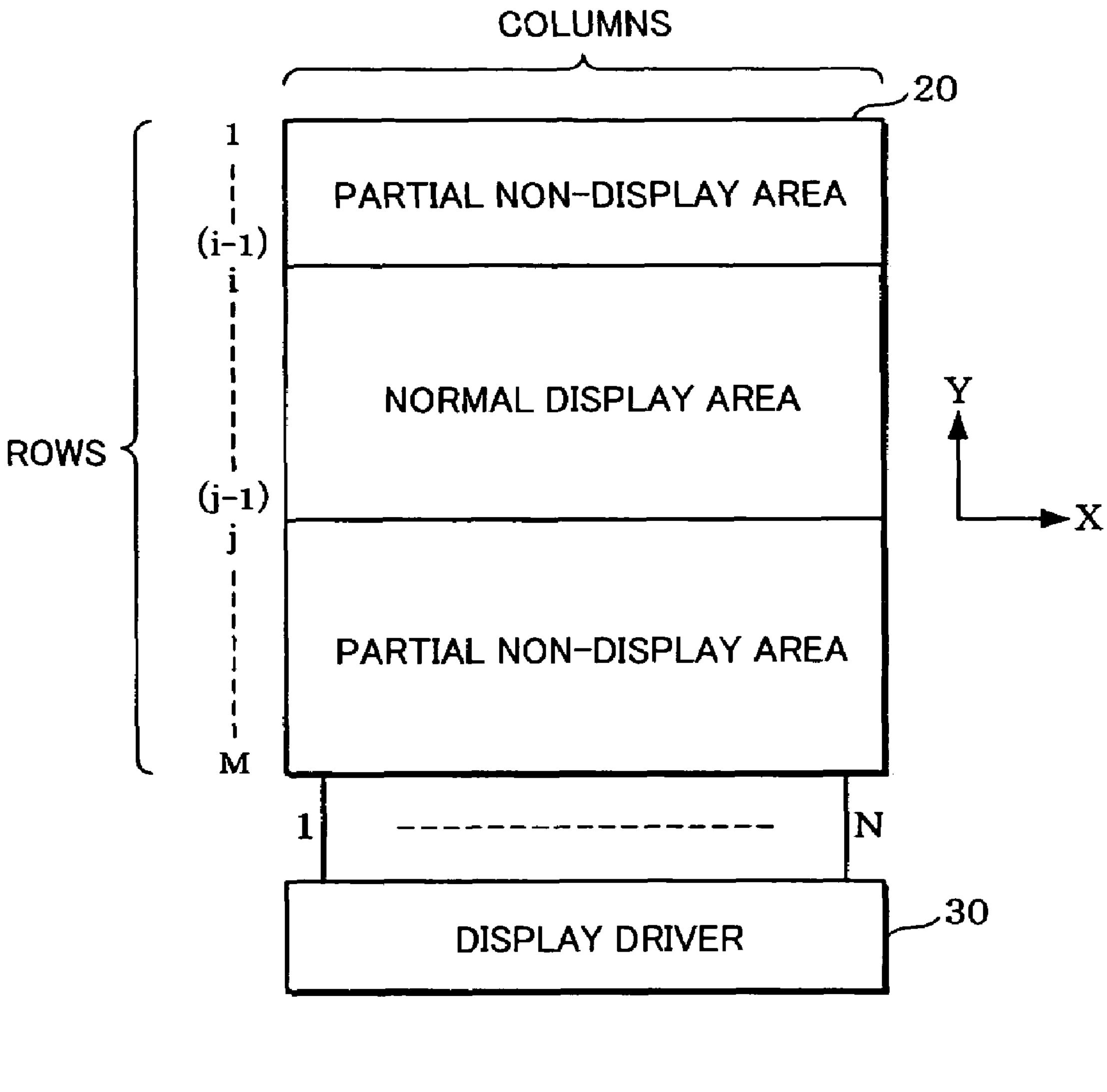
FIG. 3 is a diagram for illustrating a horizontal partial display function according to one embodiment of the present invention.

FIG. 3 is a diagram for illustrating the horizontal partial display function according to one embodiment of the present invention. The horizontal partial display function may be referred to as a partial display which is performed by the display driver 30 which drives the data line provided for each column in units of the scanning lines, each of which intersects the data lines and is provided for each column.

In the partial display realized by the horizontal partial display function, a normal display area and a partial non-display area are set in units of one or more rows (scanning lines). In FIG. 3, the first row to the (i−1)th row ($2<i<M$, i is an integer) and the jth row ($i<j\leqq M$, j is an integer) to the Mth row are set in the partial non-display area, and the ith row to the (j−1)th row are set in the normal display area.

In the select period of the scanning line in the normal display area, the data line is driven by the display driver 30 by using a drive voltage based on the display data. The data line is driven by an operational amplifier having high drive capability.

In the select period of the scanning line in the partial non-display area, the data line is driven by the display driver 30 by using a partial non-display voltage. The partial non-display voltage is supplied to the data line while limiting or stopping the operating current of the operational amplifier having high drive capability. As the partial non-display voltage, an OFF voltage which does not cause the transmissivity of the pixel connected with the selected scanning line to change, or a voltage corresponding to the most significant bit of gray-scale data may be used.

If the partial non-display area is set by using the horizontal partial display function, the data line is driven by the operational amplifier having high drive capability only in the display period, and the operating current of the operational amplifier is reduced in the non-display period, whereby power consumption can be reduced.

Therefore, it is necessary for the display driver 30 having the above-described horizontal partial display function to drive the data line while recognizing the row to be drawn (scanning line to be selected). As a comparative example, a case where the display driver detects a drawing row while considering the horizontal scanning period immediately after the vertical synchronization signal as the first row is described below.

Figure 4:
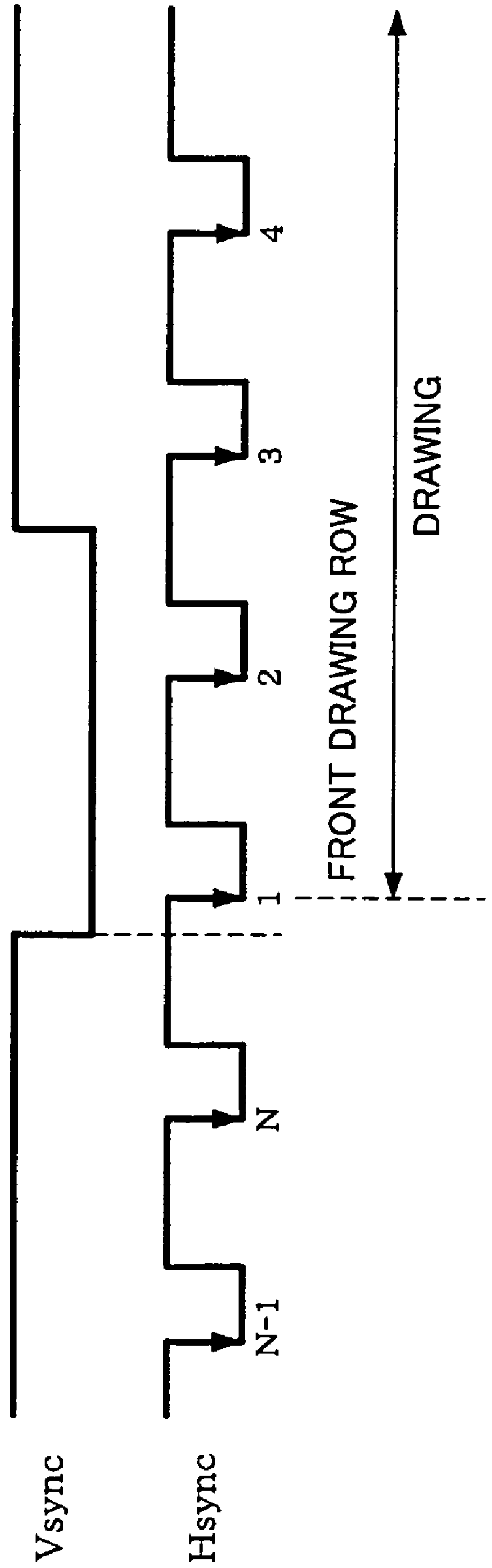
FIG. 4 is a timing chart showing a detection timing of a drawing row of a display driver according to a comparative example to one embodiment of the present invention.

FIG. 4 is a timing chart showing a detection timing of a drawing row of a display driver according to a comparative example to one embodiment of the present invention. The drawing row can be determined by counting the falling edge of the horizontal synchronization signal Hsync after the vertical synchronization signal Vsync has fallen.

However, the following problems occur in the display driver in the comparative example.

The first problem is that there may be a case where the first row of the scanning driver which drives the LCD panel does not coincide with the front drawing row.

Figure 5:
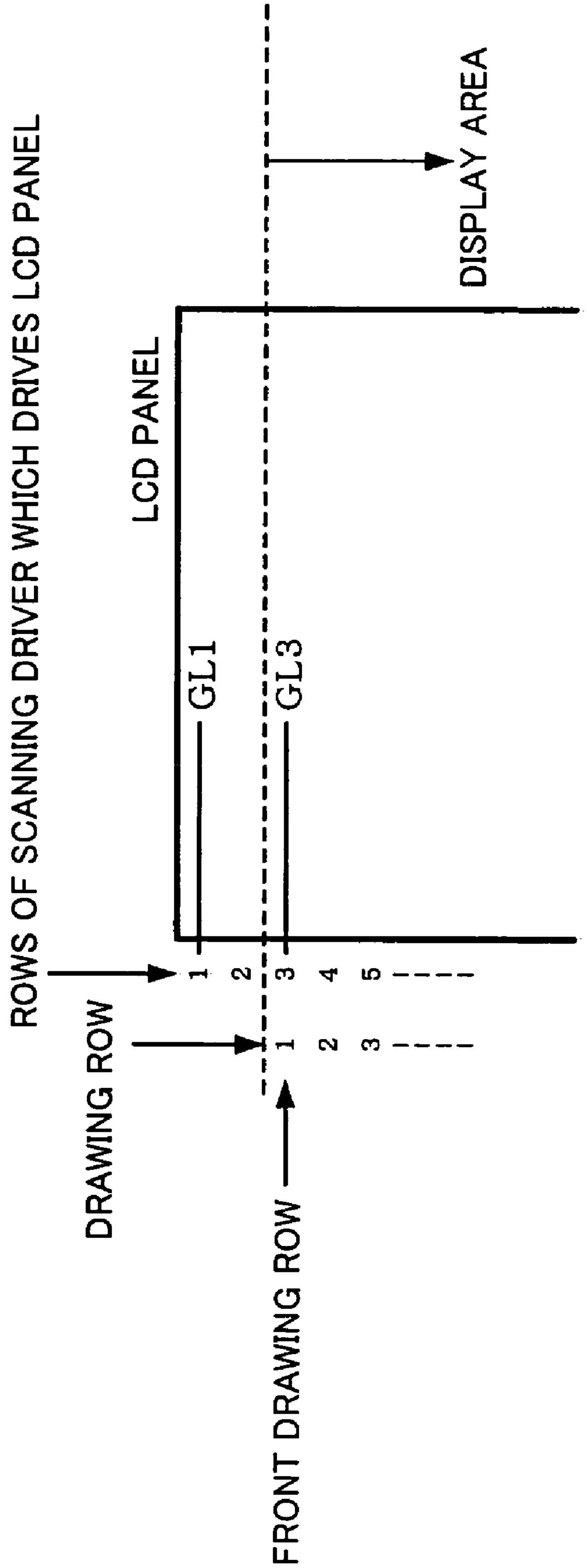
FIG. 5 is a diagram showing a case where a first row in a scanning driver which drives an LCD panel does not coincide with a front drawing row in the comparative example shown in FIG. 4.

FIG. 5 shows a case where the first row in the scanning driver which drives the LCD panel does not coincide with the front drawing row. The start timing of the first row differs depending on the LCD panel mounted on the electronic instrument. This is because the first row of the scanning driver which drives the LCD panel is not necessarily the display area depending on the LCD panel. In this case, since the display driver in the comparative example counts the actual row of the LCD panel, the number of the counted row may differ from the number of the drawing rows, whereby a shift occurs in the image displayed on the LCD panel.

The second problem is that the number of scanning lines per block is decreased in the case of setting the normal display area and the partial non-display area in units of blocks including the scanning lines.

Figure 6:
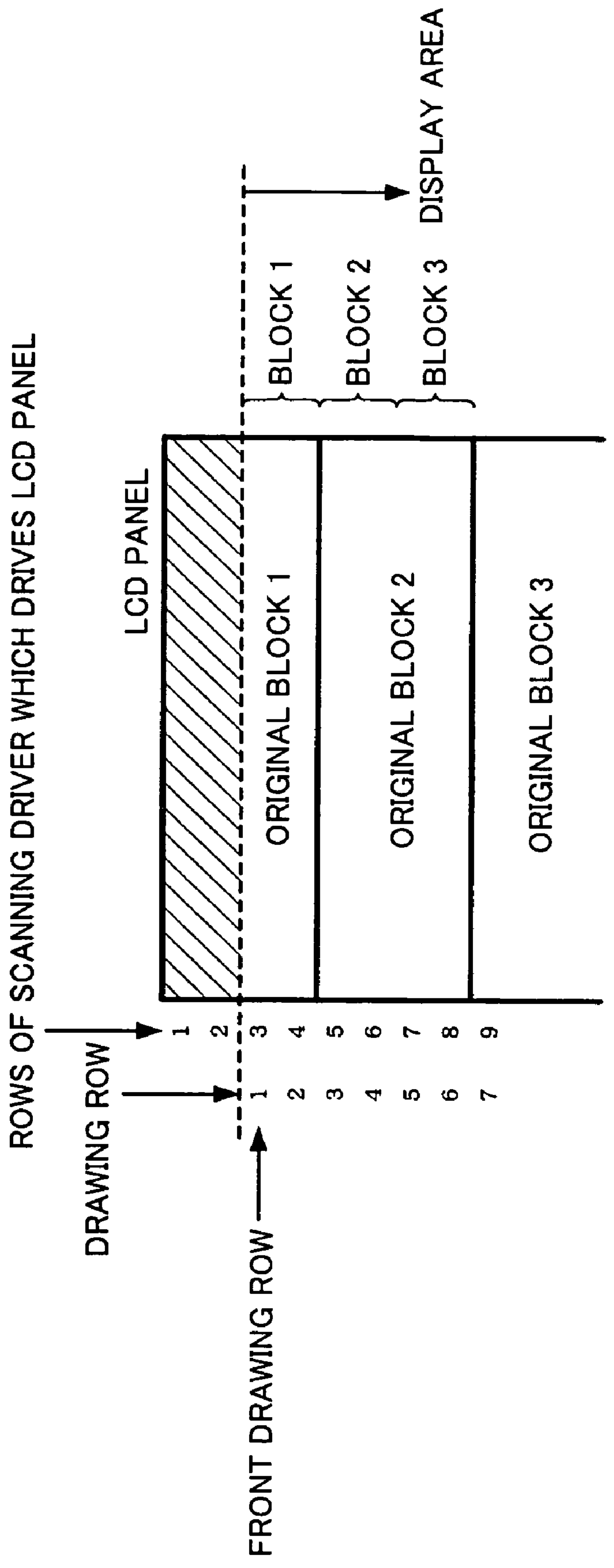
FIG. 6 is a diagram showing setting of a normal display area and a partial non-display area in units of blocks in the comparative example shown in FIG. 4.

FIG. 6 shows setting of a normal display area and the partial non-display area in units of blocks. In this example, the normal display area and the partial non-display area may be originally set in units of blocks divided into units of four scanning lines of the LCD panel. In this case, the first and second rows of the scanning driver which drives the LCD panel are not the display area. Therefore, a shift of the display image occurs if the partial display is realized in units of blocks in this state.

The partial display control can be simplified and the memory capacity can be reduced by determining the block unit based on the size of fonts or marks (marks which indicate the amount of remaining battery life or antenna sensitivity in portable telephones) displayed on the LCD panel. However, in the case shown in FIG. 6, it is necessary to divide the display area into blocks in units of two scanning lines in order to realize the partial display in units of blocks and avoid a shift of the display image. This increases the number of blocks which realize the partial display, whereby the memory capacity is wasted. Therefore, the advantage obtained by dividing the display area in units of blocks is reduced.

To deal with these problems, the display driver 30 in this embodiment has a configuration in which the front drawing row can be designated and the drawing rows can be determined based on the front drawing row. This enables the horizontal partial display to be implemented in a state in which the number of the scanning lines in the display section of the LCD panel coincides with the number of the drawing rows.

Figure 7:
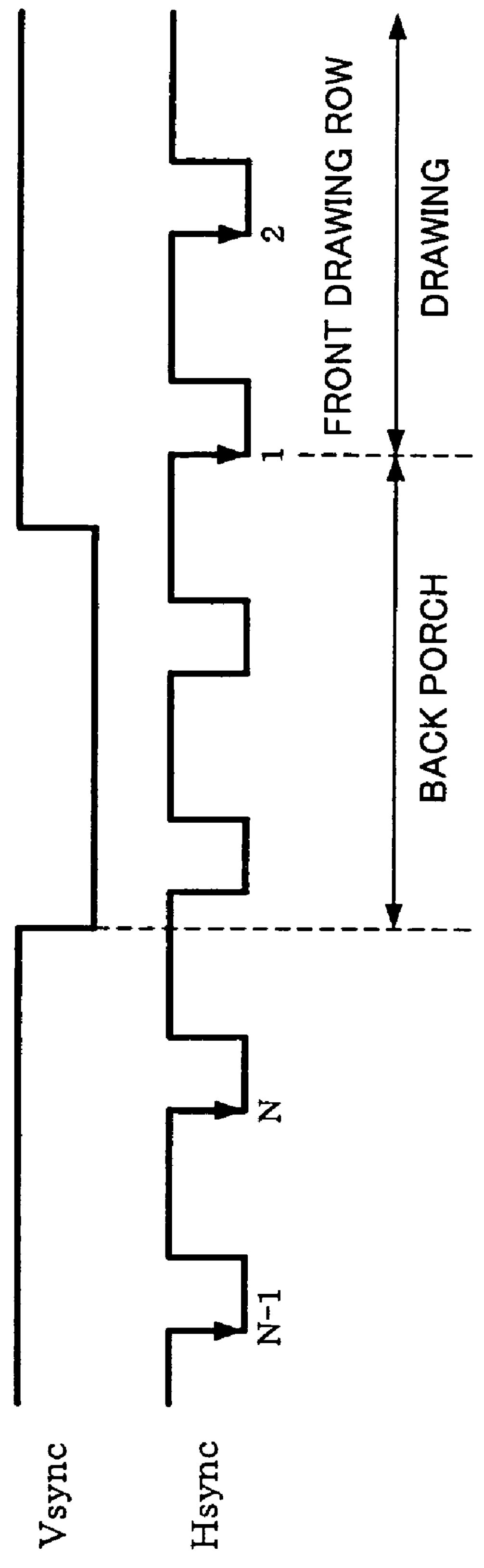
FIG. 7 is a timing chart showing a detection timing of a drawing row of a display driver according to one embodiment of the present invention.

FIG. 7 is a timing chart showing a detection timing of a drawing row of the display driver according to one embodiment of this embodiment. In this embodiment, after a period set in advance (back porch) has elapsed after the falling edge of the vertical synchronization signal Vsync, the drawing rows are counted by counting the falling edge of the horizontal synchronization signal Hsync.

Figure 8:
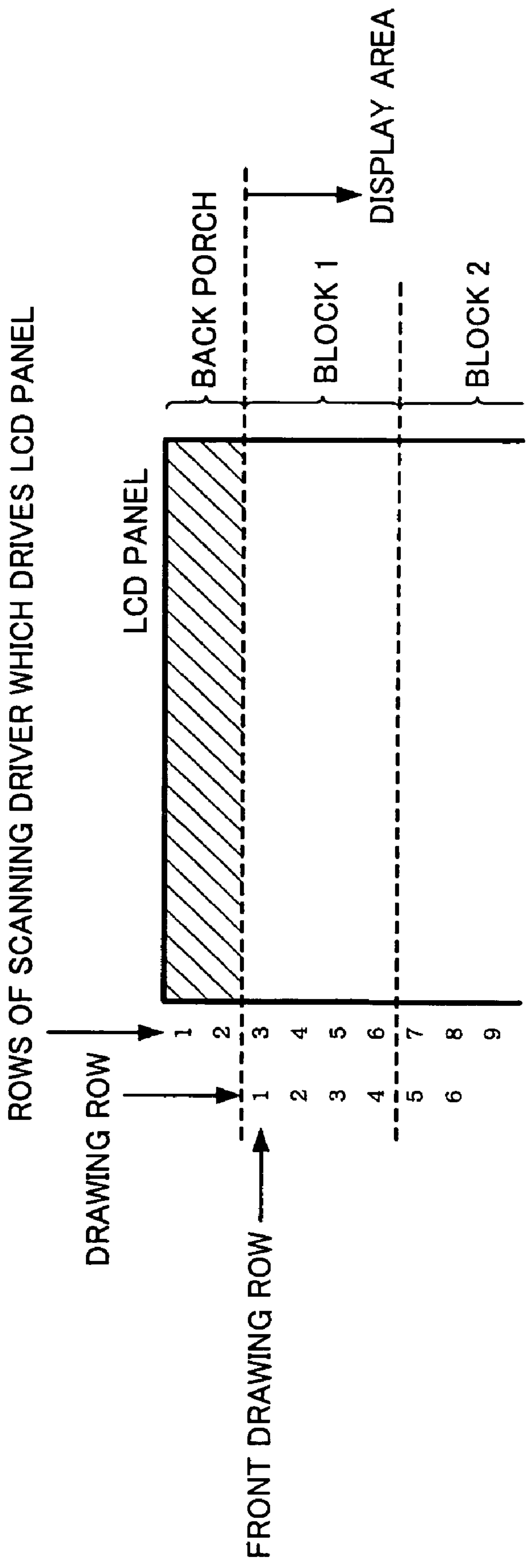
FIG. 8 is a diagram showing setting of a normal display area and a partial non-display area in units of blocks by a display driver according to one embodiment of the present invention.

FIG. 8 is a diagram showing setting of a normal display area and the partial non-display area in units of blocks by the display driver according to one embodiment of the present invention. Since the back porch can be set in the display driver 30, the normal display area and the partial non-display area can be set after the back porch has elapsed in units of blocks divided in units of four scanning lines of the LCD panel.

This enables the number of the drawing rows to be determined to coincide with the number of the scanning lines in the display area, whereby a shift of the display image can be prevented, and the memory capacity can be reduced accompanying designation in units of blocks. Moreover, a display driver which can be controlled by using a general-purpose controller which does not have the horizontal partial display function can be provided.

3. Display Driver

Figure 9:
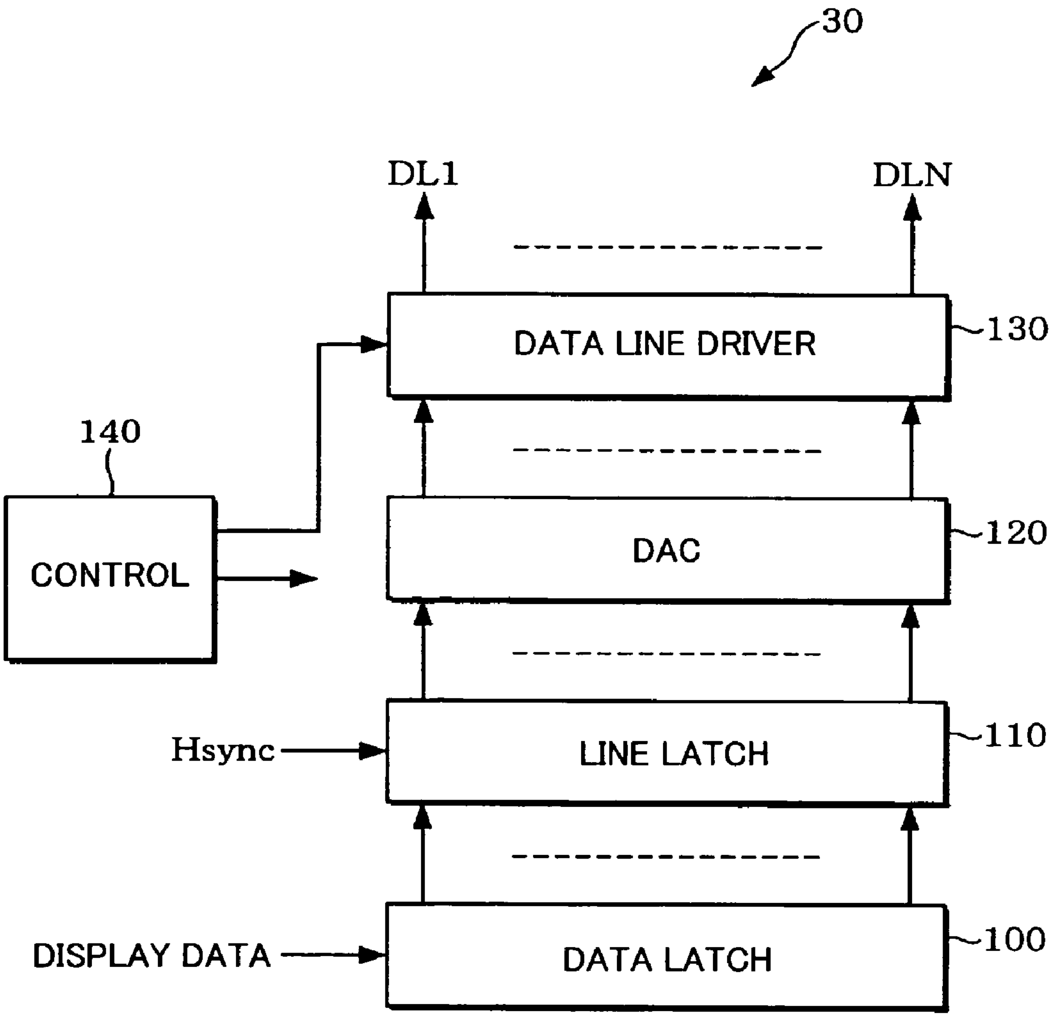
FIG. 9 is a block diagram showing the configuration of a display driver according to one embodiment of the present invention.

FIG. 9 is a block diagram showing the configuration of the display driver 30 according to one embodiment of the present invention. The display driver 30 includes a data latch 100, a line latch 110, a digital-to-analog converter (DAC) (voltage select circuit in a broad sense) 120, a data line driver circuit 130, and a control section 140.

The data latch 100 captures display data in one horizontal scanning cycle.

The line latch 110 latches the display data captured by the data latch 100 as gray-scale data corresponding to the data line based on the horizontal synchronization signal Hsync.

The DAC 120 selectively outputs the drive voltage (gray-scale voltage) corresponding to the gray-scale data from the line latch 110 in units of data lines from a plurality of reference voltages, each of which corresponds to the gray-scale data. In more detail, the DAC 120 decodes the gray-scale data from the line latch 110, and selects one of the reference voltages based on the decode result. The reference voltage selected by the DAC 120 is output to the data line driver circuit 130 as the drive voltage.

The data line driver circuit 130 drives at least one of the data lines DL1 to DLN based on the drive voltage from the DAC 120 or the partial non-display voltage.

The control section 140 controls each section of the display driver 30 shown in FIG. 9.

Figure 10:
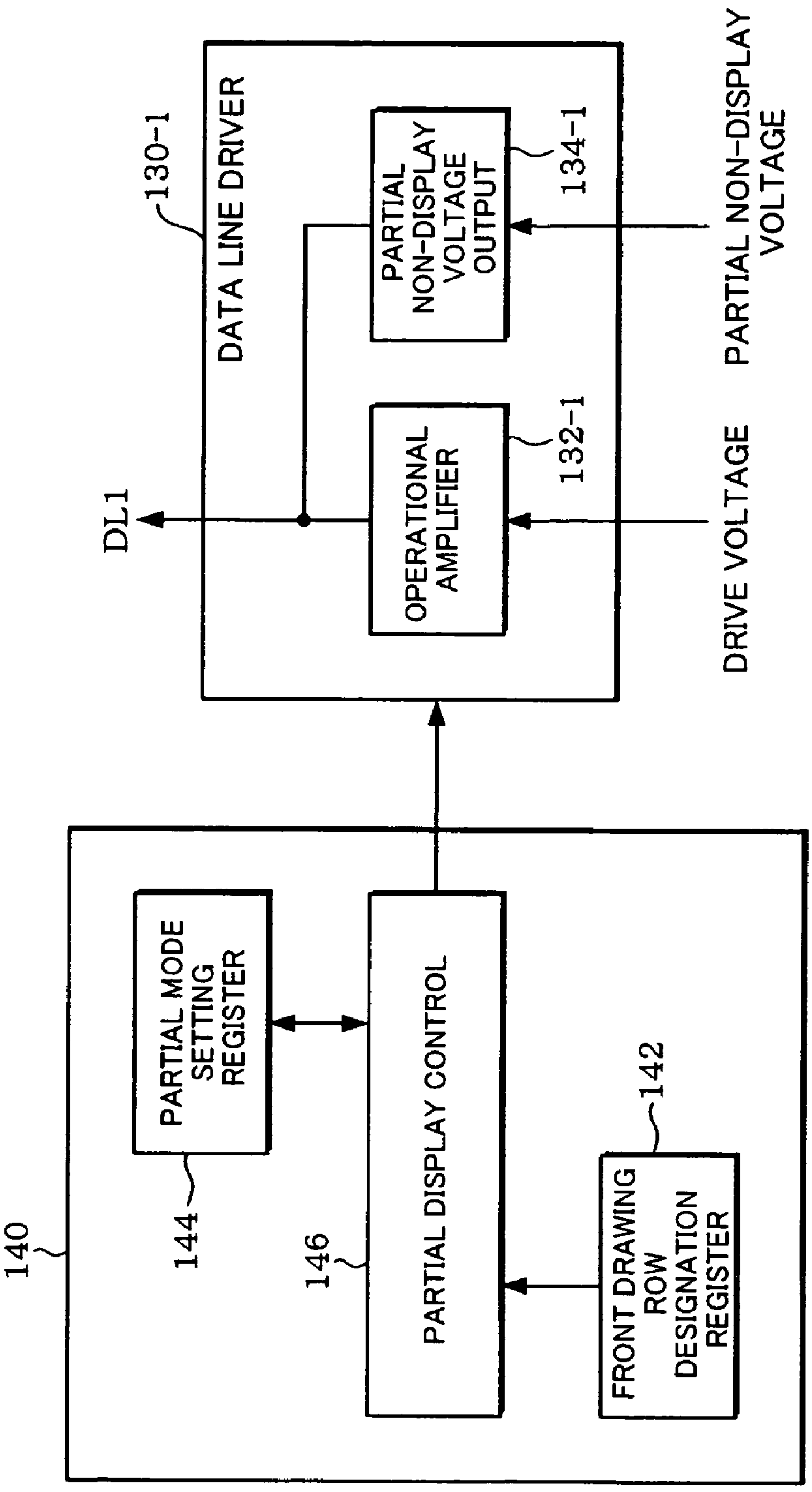
FIG. 10 is a block diagram showing main components of the display device according to one embodiment of the present invention.

FIG. 10 is a block diagram showing main components of the display driver 30. The data line driver circuit 130-1 which is part of the data line driver circuit 130 for one output is shown in this figure.

The control section 140 includes a front drawing row designation register 142, a partial mode setting register 144, and a partial display control circuit 146. The data line driver circuit 130-1 includes an operational amplifier section 132-1 and a partial non-display voltage output section 134-1. The data line driver circuit 130-1 is capable of driving the data line DL1. In FIG. 10, only the data line driver circuit 130-1 is illustrated. However, the data line driver circuits 130-2 to 130-N, which drive the data lines DL2 to DLN, have the same configuration as that of the data line driver circuit 130-1. The data line driver circuits 130-2 to 130-N are also driven by the control signal from the control section 140.

A back porch set value is set in the front drawing row designation register 142. The back porch set value is a value for designating a scanning line corresponding to the front drawing row among the scanning lines GL1 to GLM. As the back porch set value, the number of scanning lines from the scanning line GL1 of the LCD panel 20 to the scanning line GLx corresponding to the front drawing row ($2 \leqq x \leqq M$, x is an integer) may be used. In the case where the scanning line corresponding to the front drawing row is GL3, the number of scanning lines "2" may be used for the scanning lines GL1 to GL3.

The partial mode setting register is a register for setting the normal display mode or the partial non-display mode corresponding to each of the scanning lines.

In the select period of the scanning line set to the normal display mode, at least one of the data lines DL1 to DLN is driven by the operational amplifier section 132-1 by using the drive voltage based on the gray-scale data. In the case where the partial display is not performed in data line units, the data lines DL1 to DLN are driven by the operational amplifier section 132-1 in the select period by using the drive voltage based on the gray-scale data.

In the select period of the scanning line set to the partial non-display mode, at least one of the data lines DL1 to DLN is driven by the partial non-display voltage output section 134-1 by using the partial non-display voltage. At this time, the operating current of the operational amplifiers having high drive capability in the operational amplifier sections 132-1 to 132-N is limited or stopped. In the case where the partial display is not performed in data line units, the data lines DL1 to DLN are driven by the partial non-display voltage from the partial non-display voltage output section 134-1, and the operating current of the operational amplifiers having high drive capability in the operational amplifier sections 132-1 to 132-N is limited or stopped, in the select period.

The partial display control circuit 146 determines whether the scanning lines corresponding to the drawing rows determined based on the scanning line (or the front drawing row) designated by the front drawing row designation register 142 are set to the normal display mode or the partial non-display voltage by the partial mode setting register 144. The partial display control circuit 146 performs the above-described drive control for the data line driver circuits 130-1 to 130-N corresponding to the determined mode.

In more detail, when the scanning lines corresponding to the drawing rows determined based on the scanning line designated by the front drawing row designation register 142 as the front drawing row are set to the normal display mode, the partial display control circuit 146 drives at least one of the data lines (data line DL1, for example) by using the operational amplifier sections 132-1 to 132-N based on the drive voltage. When the scanning lines are set to the partial non-display mode, the partial display control circuit 146 limits or stops the operating current of the operational amplifier sections 132-1 to 132-N, and drives at least one of the data lines (data line DL1, for example) by using the partial non-display voltage output sections 134-1 to 134-N based on the partial non-display voltage.

The above description illustrates the case where the partial display control circuit 146 performs the partial display for every scanning line. However, the partial display control circuit 146 may control the partial display in units of blocks including a plurality of scanning lines. Specifically, the partial display control circuit 146 determines whether a block including the scanning lines corresponding to the drawing rows determined based on the scanning line designated by the front drawing row designation register 142 as the front drawing row is set to either the normal display mode or the partial non-display mode.

Figure 11:
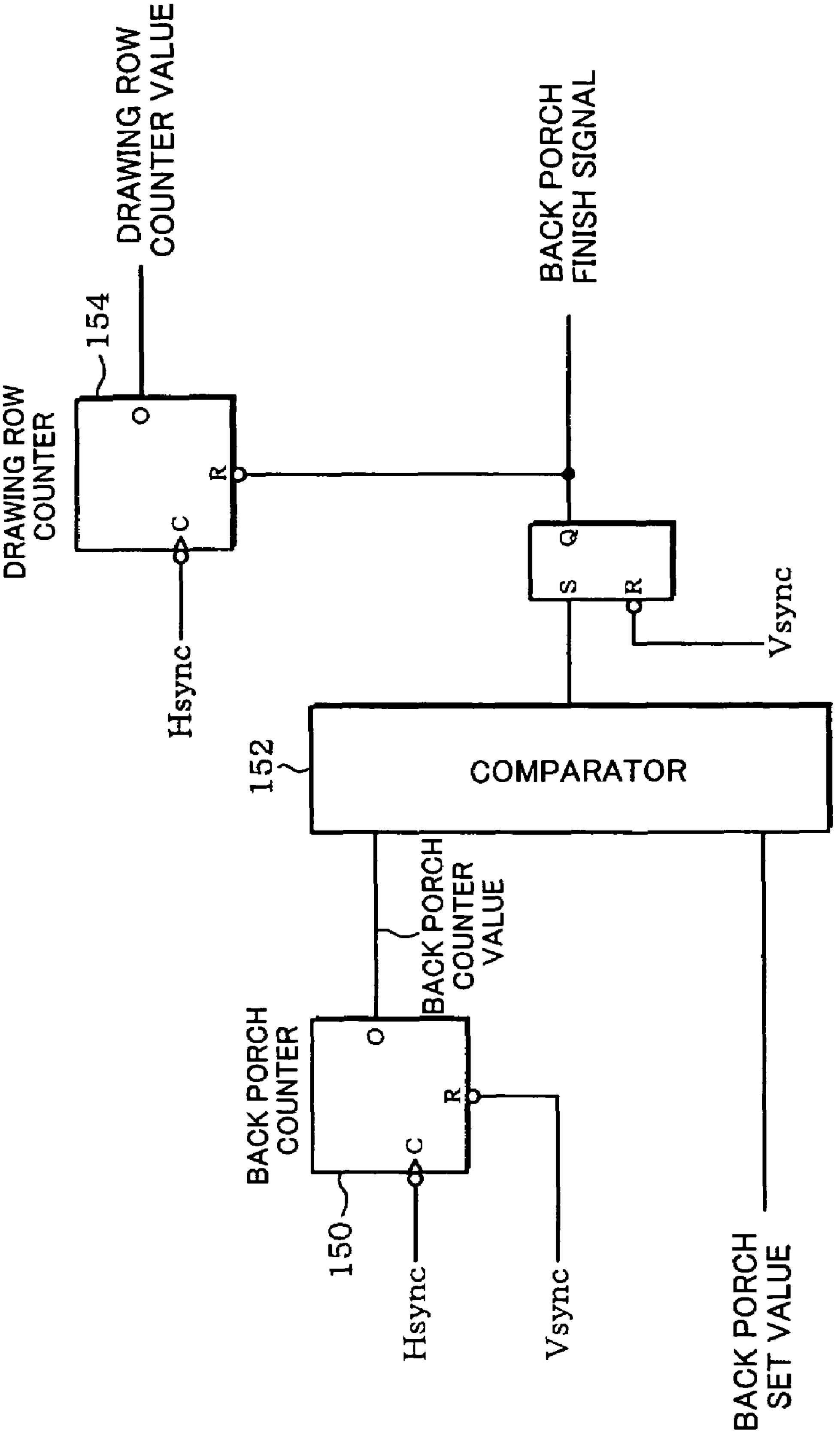
FIG. 11 is a block diagram showing one example of main components in the partial display control circuit shown in FIG. 10.

FIG. 11 is a block diagram showing main components of the partial display control circuit 146. The partial display control circuit 146 shown in FIG. 11 starts counting the drawing rows after the period set by the back porch set value has elapsed in the vertical scanning period.

A back porch counter 150 resets a back porch counter value based on the vertical synchronization signal Vsync, and increments the back porch counter value based on the horizontal synchronization signal Hsync.

A comparator 152 compares the back porch set value set in the front drawing row designation register 142 with the back porch counter value, and outputs a comparison result signal.

The comparison result signal sets the output of an RS flip flop. The output of the RS flip flop is reset by the vertical synchronization signal Vsync. The output of the RS flip flop is output as a back porch finish signal.

A drawing row counter 154 resets a drawing row counter value in response to the back porch finish signal, and increments the drawing row counter value based on the horizontal synchronization signal Hsync.

Figure 12:
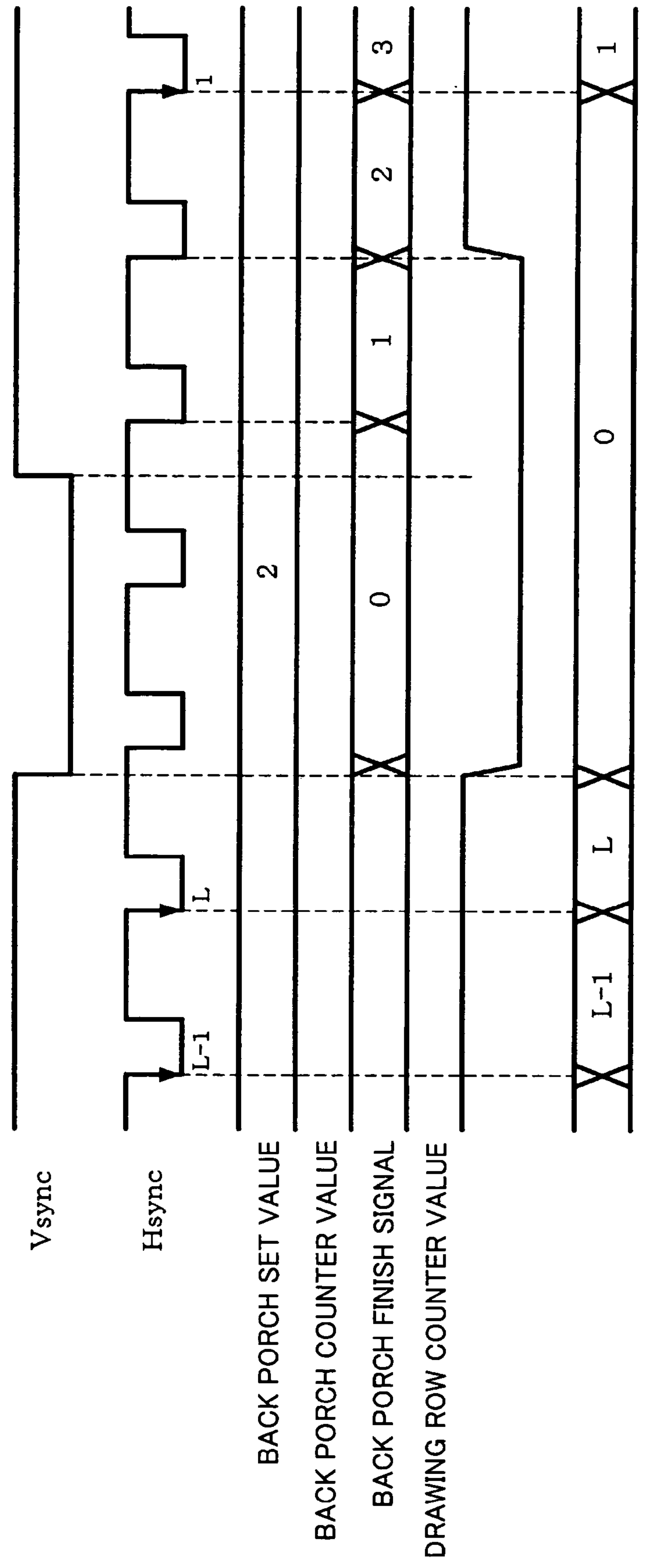
FIG. 12 is a timing chart showing an operational example of the partial display control circuit shown in FIG. 11.

FIG. 12 is a timing chart showing an operational example of the partial display control circuit 146 shown in FIG. 11. In FIG. 12, the back porch set value is set at "2" so that the scanning line GL3 of the LCD panel 20 is the front drawing row.

The back porch counter value reset by the vertical synchronization signal Vsync is incremented by the horizontal synchronization signal Hsync. When the back porch counter value becomes "2", the comparison result signal output from the comparator 152 becomes "H", whereby the back porch finish signal is set. After the back porch finish signal has been set, the drawing row counter 154 starts incrementing the drawing row counter value based on the horizontal synchronization signal Hsync.

According to this configuration, counting of the drawing row counter value starts after the period specified by the back porch set value has elapsed, whereby the drawing row counter value can coincide with the number of the drawing row of the LCD panel 20. The partial display control circuit 146 performs the above-described drive control in units of the drawing rows corresponding to the mode set in the partial mode setting register 144 by using the drawing row counter value obtained in this manner.

Figure 13:
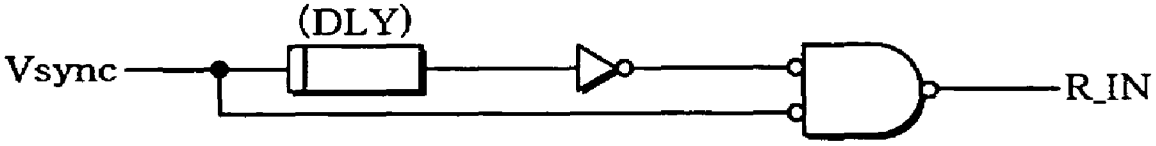
FIG. 13 is a circuit diagram showing a falling edge detection circuit according to one embodiment of the present invention.

An output signal R_IN of a falling edge detection circuit including a delay circuit DLY shown in FIG. 13 may be input to the reset terminal of the back porch counter 150 shown in FIG. 11 instead of the vertical synchronization signal Vsync.

FIG. 13 is a circuit diagram showing the falling edge detection circuit. This falling edge detection circuit detects the falling edge of the vertical synchronization signal Vsync.

Figure 14:
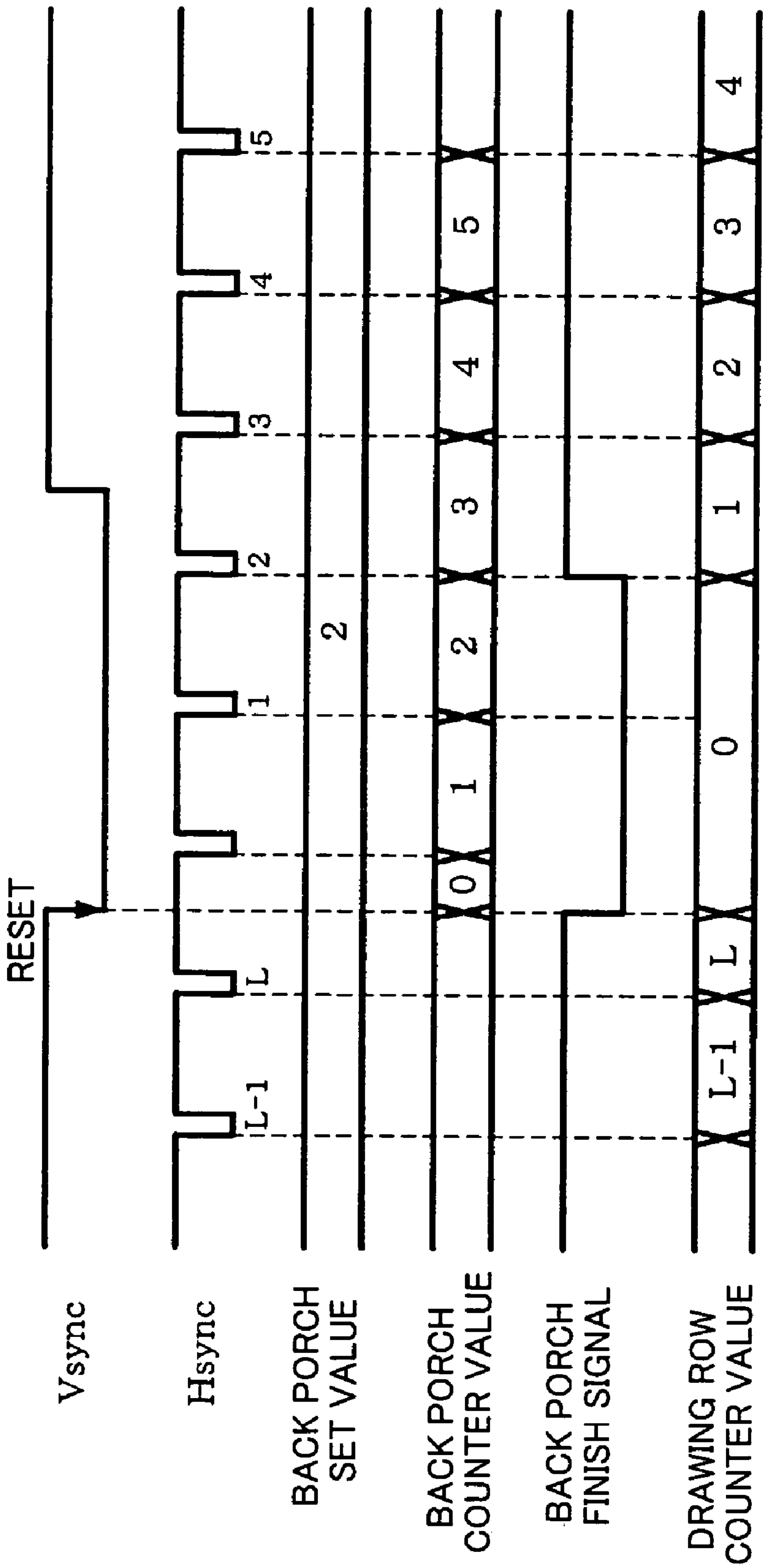
FIG. 14 is a timing chart showing another operational example of the partial display control circuit shown in FIG. 11.

FIG. 14 is a timing chart showing another operational example of the partial display control circuit 146. FIG. 14 shows an operation example in the case where the output signal R_IN of the falling edge detection circuit shown in FIG. 13 is input to the reset terminal of the back porch counter 150 shown in FIG. 11. In this case, the back porch counter 150 counts the back porch counter value immediately after the falling edge of the vertical synchronization signal Vsync.

Figure 15:
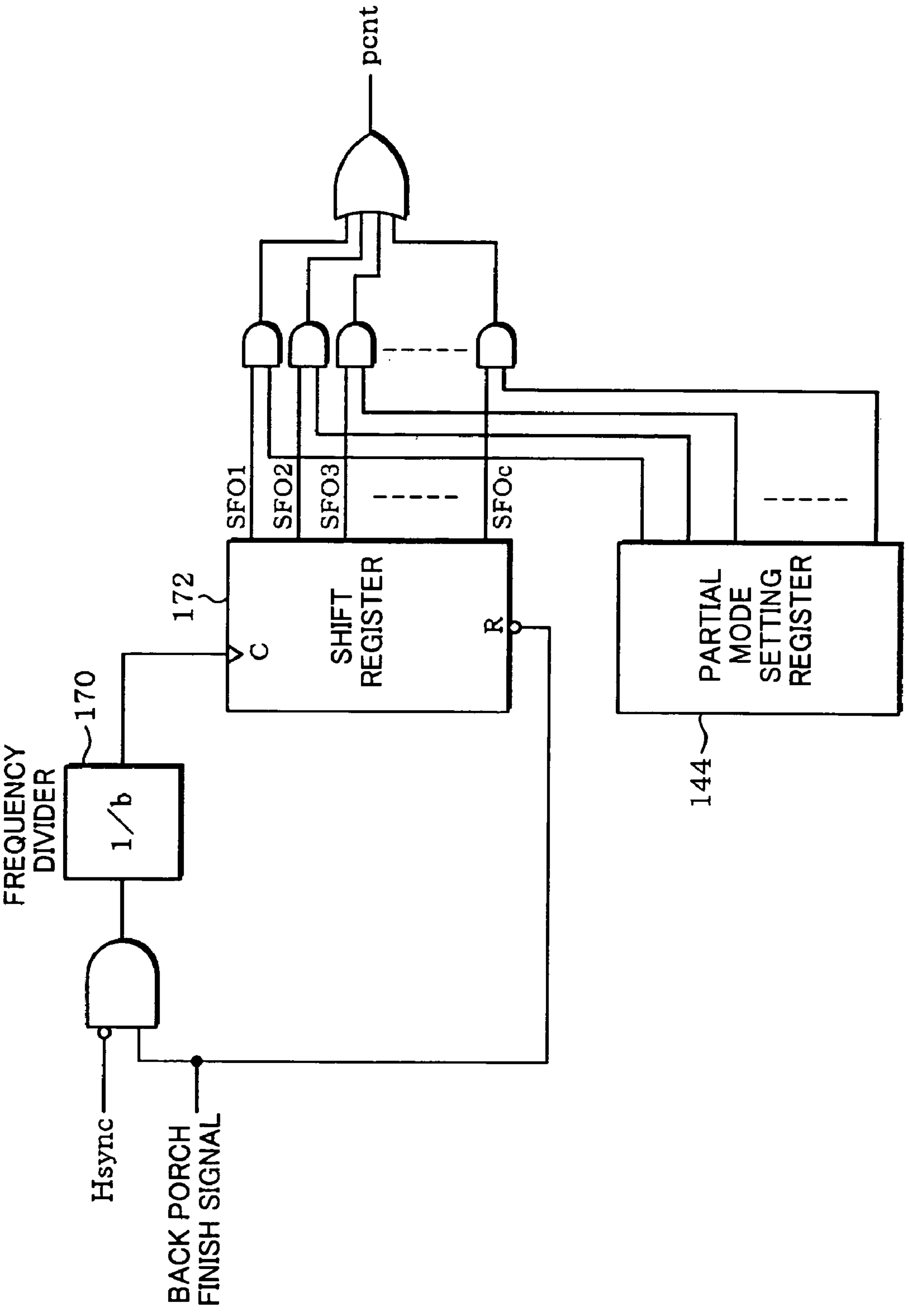
FIG. 15 is a block diagram showing another example of main components of the partial display control circuit shown in FIG. 10.

FIG. 15 is a block diagram showing another example of main components of the partial display control circuit 146. The partial display control circuit 146 shown in FIG. 15 controls the partial display in units of blocks after the period set by the back porch set value has elapsed in the vertical scanning period. In more detail, the partial display control circuit 146 controls the partial display for a block having the scanning lines corresponding to the drawing rows determined based on the scanning line designated by the back porch set value as the front drawing row.

The back porch finish signal is generated by the same configuration as the configuration shown in FIG. 12. Therefore, description of the back porch finish signal is omitted. The partial display is controlled in units of blocks divided into units of b scanning lines (b is an integer of two or more).

A frequency divider 170 divides the frequency of the input signal by b. In more detail, the frequency divider 170 outputs the pulse of an output signal each time the pulse of the input signal is input b times. The input signal of the frequency divider 170 is generated by the horizontal synchronization signal Hsync and the back porch finish signal. The output signal of the frequency divider 170 is input to a clock terminal of a shift register 172.

The internal state of the shift register 172 is reset by the back porch finish signal. The shift register 172 outputs a shift output signal which is shifted based on the signal input to the clock terminal.

Figure 16:
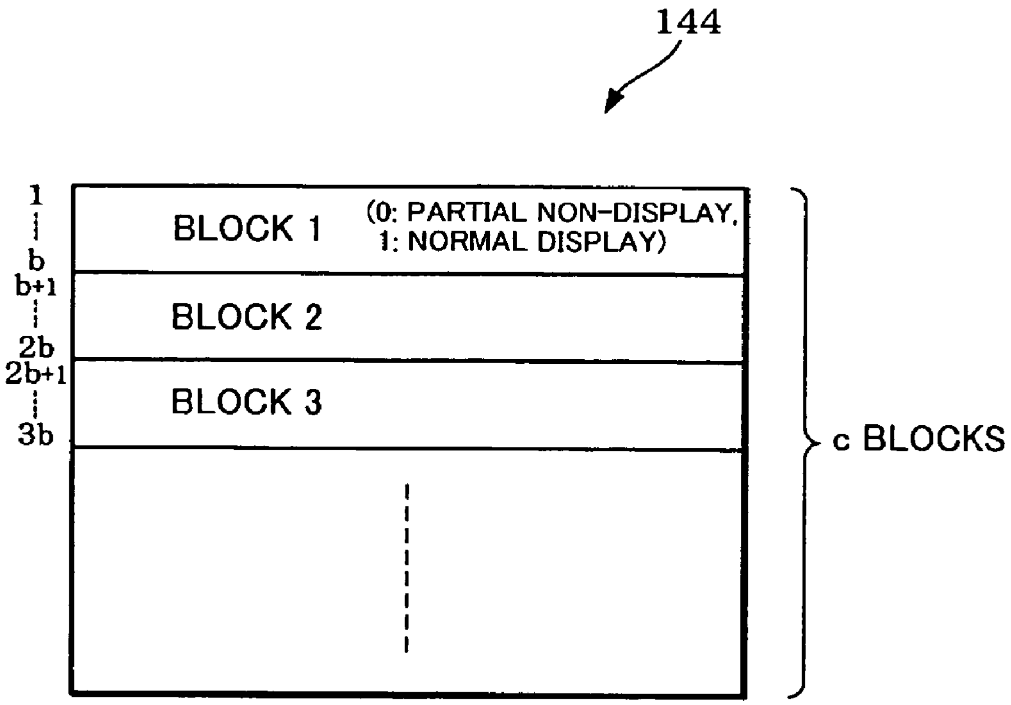
FIG. 16 is a diagram showing the contents of the partial mode setting register shown in FIG. 10.

FIG. 16 shows the contents of the partial mode setting register 144. Either "0" or "1" is set in the partial mode setting register 144 in units of blocks. Either the normal display mode or the partial non-display mode is set to the partial mode setting register 144 for each of the c blocks (c is an integer of two or more).

Either the normal display mode or the partial non-display mode is set in the block 1 for the scanning lines corresponding to the first to b-th drawing rows. Either the normal display mode or the partial non-display mode is set in the block 2 for the scanning lines corresponding to the (b+1)th to 2b-th drawing rows. Either the normal display mode or the partial non-display mode is set in the block S ($1 \leqq S \leqq c$, S is an integer) for the scanning lines corresponding to the $((S-1)\cdot b+1)$th to $(S\cdot b)$th drawing rows.

The block in which "0" is set is set to the partial non-display mode. The block in which "1" is set is set to the normal display mode.

As shown in FIG. 12, after the back porch finish signal is set, the drawing rows can be counted by using the horizontal synchronization signal Hsync. On the contrary, the frequency divider 170 shown in FIG. 15 counts the drawing rows in units of b. The frequency divider 170 generates the pulse of the output signal in units of b drawing rows.

The shift register 172 has c shift outputs SFO1 to SFOc (c is an integer of two or more). Each of the shift outputs corresponds to each of the blocks set in the partial mode setting register 144.

In FIG. 15, the logical AND of the shift output SFO1 from the shift register 172 and the set value of the block 1 of the partial mode setting register 144 is generated. The logical AND of the shift output SFO2 from the shift register 172 and the set value of the block 2 of the partial mode setting register 144 is generated. The logical AND of the shift output SFOS (1≦S≦c, S is an integer) from the shift register 172 and the set value of the block S of the partial mode setting register 144 is generated.

The logical OR operation result for the outputs of the logical AND corresponding to each of the blocks is output as a partial display control signal pcnt.

When the partial display control signal pcnt is "H", the data line driver circuit 130 is controlled in the normal display mode. When the partial display control signal pcnt is "L", the data line driver circuit 130 is controlled in the partial non-display mode.

Figure 17:
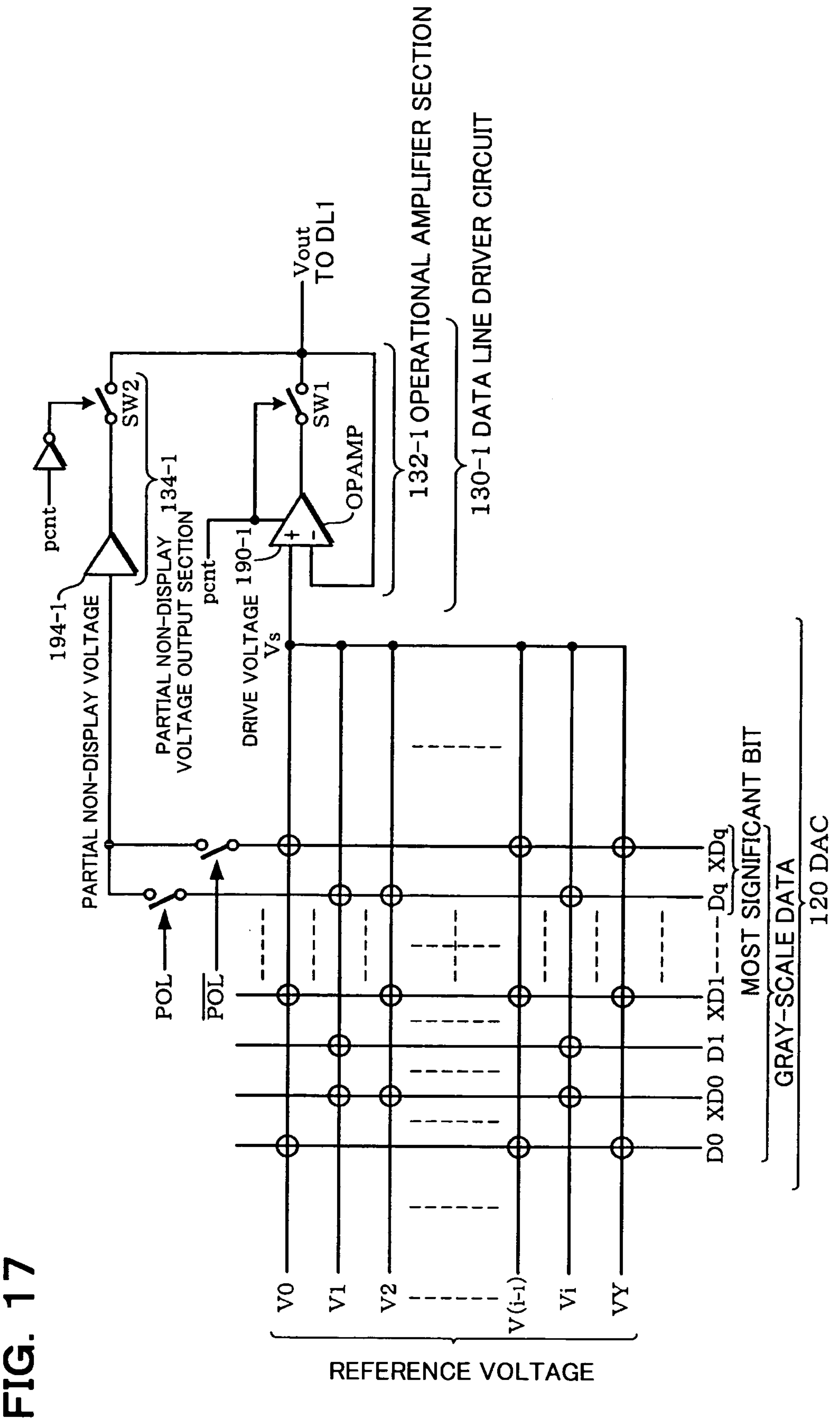
FIG. 17 is a circuit diagram showing one example of the data line driver circuit for one output shown in FIG. 10.

FIG. 17 shows the configuration of the data line driver circuit 130-1. The data line driver circuits 130-2 to 130-N have the same configuration as the configuration of the data line driver circuit 130-1.

The DAC 120 may be realized by using a ROM decoder circuit. The DAC 120 selects one of the reference voltages V0 and VY and the first to ith reference voltages V1 to Vi based on (q+1) bits of gray-scale data, and outputs the selected reference voltage to the operational amplifier section 132-1 of the data line driver circuit 130-1 as the drive voltage Vs.

The DAC 120 outputs the partial non-display voltage corresponding to the most significant bit (Dq) of the gray-scale data (Dq to D0). In this example, the DAC 120 outputs the reference voltage corresponding to the most significant bit (Dq) of the gray-scale data (Dq to D0) or the inverted data of the gray-scale data corresponding to the logic level of a polarity reversal signal POL. The partial non-display voltage is output to the partial non-display voltage output section 134-1 of the data line driver circuit 130-1.

The operational amplifier section 132-1 includes a voltage-follower-connected operation amplifier 190, and a switching device SW1 which is inserted between the output of the operation amplifier 190 and an output node connected to the data line DL1 and switch-controlled by the partial display control signal pcnt.

A partial non-display voltage output section 134-1 includes a buffer 194, and a switching device SW2 which is inserted between the output of the buffer 194 and the output node connected to the data line DL1 and switch-controlled by the partial display control signal pcnt.

In this configuration, (q+1) bits of gray-scale data Dq to D0 and (q+1) bits of inverted gray-scale data XDq to XD0 are input to the DAC 120. The inverted gray-scale data XDq to XD0 is respectively obtained by bit-inversion of the gray-scale data Dq to D0. In this example, the gray-scale data Dq and the inverted gray-scale data XDq are respectively the most significant bits of the gray-scale data and the inverted gray-scale data.

In the DAC 120, one of the multi-valued reference voltages V0 to Vi and VY is selected based on the gray-scale data.

In the operational amplifier section 132-1, the switching device SW1 is turned ON when the selected scanning line (or block including the scanning line) is set to the normal display mode, whereby the data line DL1 is driven based on the drive voltage Vs. In the operational amplifier section 132-1, the switching device SW1 is turned OFF when the selected scanning line (or block including the scanning line) is set to the partial non-display mode, and the operating current of the operation amplifier 190 is limited or stopped.

In the partial non-display voltage output section 134-1, the switching device SW2 is turned OFF when the selected scanning line (or block including the scanning line) is set to the normal display mode, and the output of the partial non-display voltage output section 134-1 is set to a high impedance state. In the partial non-display voltage output section 134-1, the switching device SW2 is turned ON when the selected scanning line (or block including the scanning line) is set to the partial non-display mode, whereby the partial non-display voltage is output to the data line DL1.

An image having the number of display colors corresponding to the number of bits of the gray-scale data can be displayed in the normal display area in which the selected scanning line (or block including the scanning line) is set to the normal display mode by driving each of the data lines in this manner. An eight-color display can be performed in the partial non-display area in which the selected scanning line (or block including the scanning line) is set to the partial non-display mode by using the most significant bits of each of the RGB signals.

The above description illustrates the case where the data line DL1 is driven in either the normal display mode or the partial non-display mode. However, the present invention is not limited thereto. In the case of performing a so-called vertical partial display, for example, it is unnecessary to drive the data line corresponding to the vertical partial non-display area based on the drive voltage even in the normal display mode.

4. Other Embodiments

The above embodiment is described taking a liquid crystal device including a liquid crystal panel using TFTs as an example. However, the present invention is not limited thereto. The above voltage may be converted into a current by a current conversion circuit and supplied to a current-driven device. This enables the present invention to be applied to a display driver which drives an organic EL panel including organic EL devices provided corresponding to pixels specified by data lines and scanning lines, for example.

Figure 18:
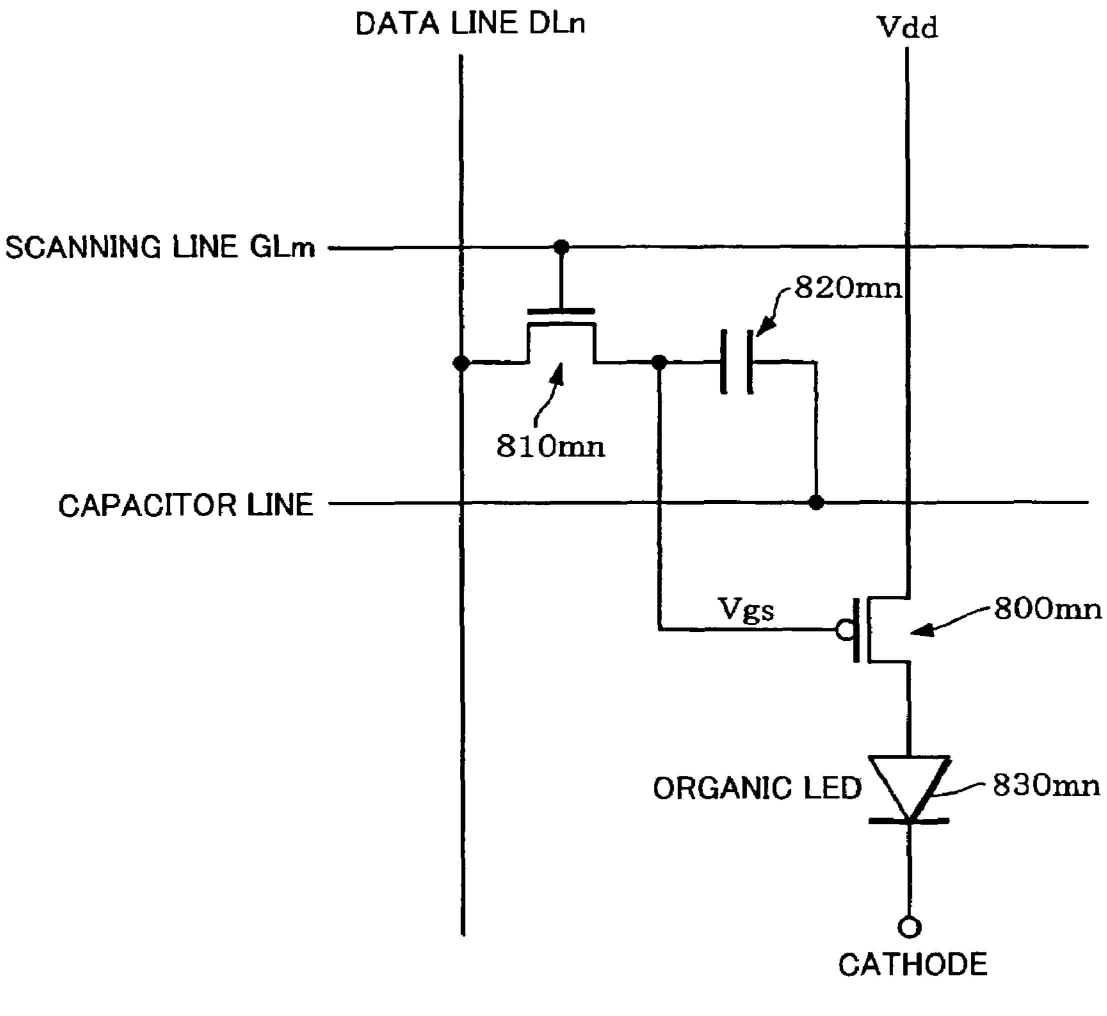
FIG. 18 is a circuit diagram showing a two transistor type pixel circuit in an organic EL panel according to one embodiment of the present invention.

FIG. 18 shows an example of a two transistor type pixel circuit in an organic EL panel driven by such a display driver.

The organic EL panel includes a drive TFT 800*mn*, a switch TFT 810*mn*, a storage capacitor 820*mn*, and an organic LED 830*mn* at an intersecting point of a data line DLn and a scanning line GLm. The drive TFT 800*mn* is formed by using a p-type transistor.

The drive TFT 800*mn* and the organic LED 830*mn* are connected in series with a power supply line.

The switch TFT 810*mn* is inserted between a gate electrode of the drive TFT 800*mn* and the data line DLn. A gate electrode of the switch TFT 810*mn* is connected with the scanning line GLm.

The storage capacitor 820*mn* is inserted between the gate electrode of the drive TFT 800*mn* and a capacitor line.

In this organic EL device, when the scanning line GLm is driven and the switch TFT 810*mn* is turned ON, the voltage of the data line DLn is written into the storage capacitor 820*mn* and applied to the gate electrode of the drive TFT 800*nm*. A gate voltage Vgs of the drive TFT 800*mn* is determined depending on the voltage of the data line DLn, whereby current flowing through the drive TFT 800*mn* is determined. Since the drive TFT 800*mn* is connected in series with the organic LED 830*mn*, the current flowing through the drive TFT 800*mn* flows through the organic LED 830*mn*.

Therefore, since the gate voltage Vgs corresponding to the voltage of the data line DLn is retained in the storage capacitor 820_mn_, a pixel which continues to shine during one frame can be realized by causing current corresponding to the gate voltage Vgs to flow through the organic LED 830_mn_ during one frame period.

Figure 19A:
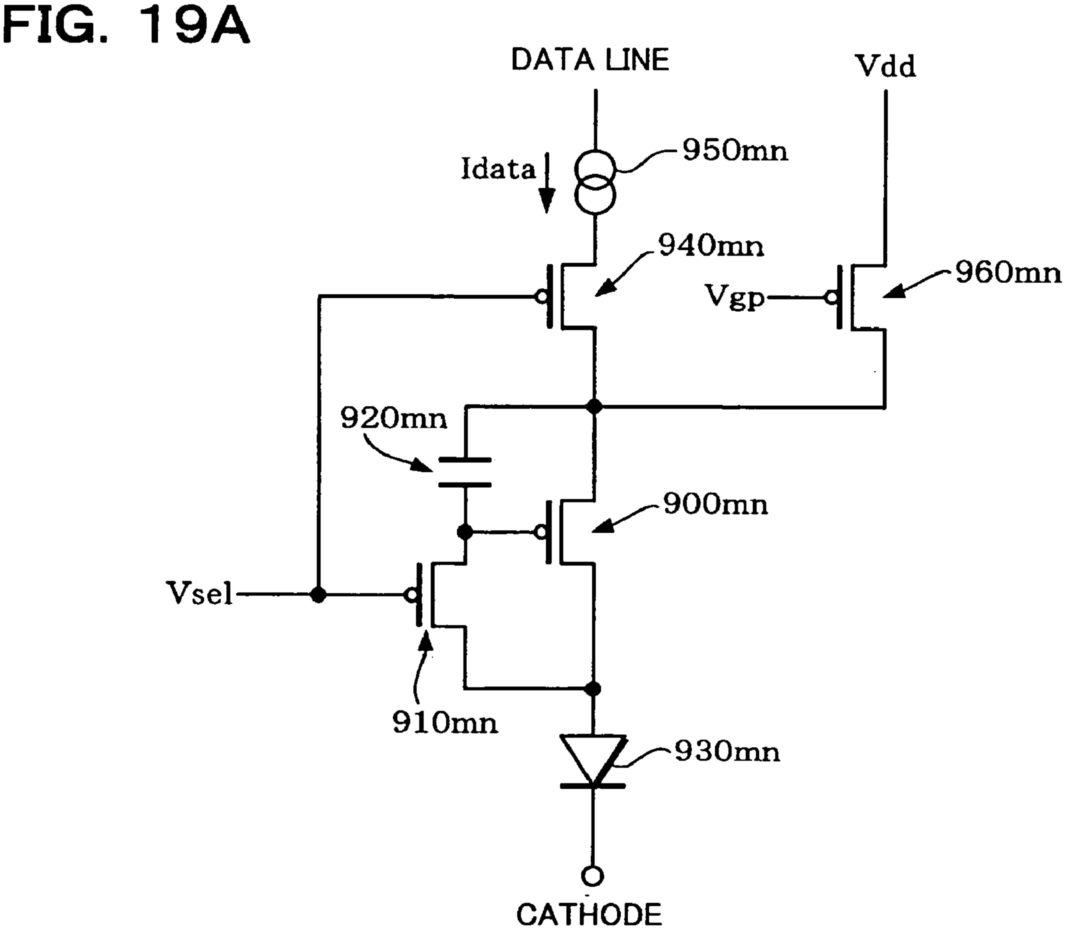
FIG. 19A is a circuit diagram showing a four transistor type pixel circuit in an organic EL panel according to one embodiment of the present invention.
Figure 19B:
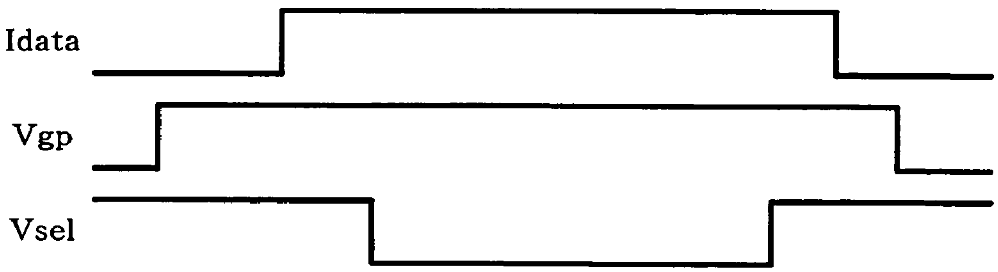
FIG. 19B is a timing chart showing a display control timing of the pixel circuit of FIG. 19A.

FIG. 19A shows an example of a four transistor type pixel circuit in an organic EL panel driven by the display driver. FIG. 19B is a timing chart showing a display control timing of this pixel circuit.

In this case, the organic EL panel includes a drive TFT 900_mn_, a switch TFT 910_mn_, a storage capacitor 920_mn_, and an organic LED 930_mn_.

The four transistor type pixel circuit differs from the two transistor type pixel circuit shown in FIG. 18 in that a constant current Idata from a constant current source 950_mn_ is supplied to the pixel through a p-type TFT 940_mn_ as a switching device instead of a constant voltage, and the storage capacitor 920_mn_ and the drive TFT 900_mn_ are connected with the power supply line through a p-type TFT 960_mn_ as a switching device.

In this organic EL device, the power supply line is disconnected by causing the p-type TFT 960_mn_ to be turned OFF by applying the gate voltage Vgp, and the constant current Idata from the constant current source 950_mn_ is caused to flow through the drive TFT 900_mn_ by turning the p-type TFT 940_mn_ and the switch TFT 910_mn_ ON by applying a gate voltage Vsel.

A voltage corresponding to the constant current Idata is retained in the storage capacitor 920_mn_ during the period until the current flowing through the drive TFT 900_mn_ becomes stable.

The p-type TFT 940_mn_ and the switch TFT 910_mn_ are turned OFF by applying the gate voltage Vsel and the p-type TFT 960_mn_ is turned ON by applying the gate voltage Vgp, whereby the power supply line is electrically connected with the drive TFT 900_mn_ and the organic LED 930_mn_. A current almost equal to or in an amount corresponding to the constant current Idata is supplied to the organic LED 930_mn_ by the voltage retained in the storage capacitor 920_mn_.

The organic LED may be formed by forming a light-emitting layer on a transparent anode (ITO) and forming a metal cathode on the light-emitting layer, or forming a light-emitting layer, a light-transmitting cathode, and a transparent seal on a metal anode. The device structure of the organic LED is not limited.

A display driver which is widely used for organic EL panels can be provided by forming the display driver which drives an organic EL panel including organic EL devices as described above.

The present invention is not limited to the above-described embodiment. Various modifications and variations are possible within the spirit and scope of the present invention. The above embodiment is described taking an active matrix type liquid crystal panel in which each pixel of the display panel includes a TFT as an example. However, the present invention is not limited thereto. The present invention can also be applied to a passive matrix type liquid crystal display. The present invention can be applied to a plasma display device in addition to the liquid crystal panel.

The display driver in this embodiment can be readily applied to a display driver which drives data lines of a comblike LCD in which the data lines are formed in the shape of the teeth of a comb (comblike distributed).

The invention according to the dependent claims may have a configuration in which a part of the constituent elements of the claim on which the invention is dependent is omitted. It is possible to allow the feature of the invention according to one independent claim to depend on another independent claim.

The following features relating to the above-described embodiments will be described below.

According to one embodiment of the present invention, there is provided a display driver which drives a plurality of data lines arranged in columns, the data lines intersecting a plurality of scanning lines arranged in rows, and the display driver comprising:

a front drawing row designation register which designates one of the scanning lines as a front drawing row;

a partial mode setting register which sets for the scanning lines either a normal display mode in which a drive voltage depending on gray-scale data is supplied to at least one of the data lines, or a partial non-display mode in which a partial non-display voltage is supplied to at least one of the data lines;

a data line driver circuit including an operational amplifier section which drives at least one of the data lines based on the drive voltage, and a partial non-display voltage output section which drives at least one of the data lines based on the partial non-display voltage; and a partial display control section which controls driving of the data line driver circuit, wherein, when part of the scanning lines which are drawing rows including the front drawing row are set to the normal display mode, the partial display control section drives at least one of the data lines by using the operational amplifier section based on the drive voltage, in a select period of the scanning lines; and wherein, when part of the scanning lines which are the drawing rows are set to the partial non-display mode, the partial display control section limits or stops an operating current of the operational amplifier section, and drives at least one of the data lines by using the partial non-display voltage output section based on the partial non-display voltage, in a select period of the scanning lines.

The normal display mode or the partial non-display mode may be set by the partial mode setting register for every one or more scanning lines.

In this display driver in which the normal display mode or the partial non-display mode is set by the partial mode setting register for the scanning lines, the front drawing row designation register designates a scanning line as a front drawing row. The partial display control section determines whether part of the scanning lines which are drawing rows including the front drawing row are set to the normal display mode or the partial non-display mode. The data line driver circuit is controlled by using the determination result, whereby a partial display function is implemented, leading to the reduction of power consumption by the operating current for the operational amplifier section having high drive capability.

The number of the drawing rows thus coincides with the number of the scanning lines in an actual display area of the display panel, enabling to avoid a shift of the display image can be prevented. Moreover, a display driver which can be controlled by a general-purpose controller having no horizontal partial display function can be provided.

In this display driver, the partial mode setting register may set each of a plurality of blocks into which the scanning lines are divided, to one of the normal display mode and the partial non-display mode; when one of the blocks having part of the scanning lines which are drawing rows including the front drawing row is set to the normal display mode, the partial display control section may drive at least one of the data lines by using the operational amplifier section based on the drive voltage, in a select period of the scanning lines; and when one of the blocks having part of the scanning lines which are the drawing rows is set to the partial non-display mode, the partial display control section may limit or stop an operating current of the operational amplifier section, and drive at least one of the data lines by using the partial non-display voltage output section based on the partial non-display voltage, in a select period of the scanning lines.

The partial mode setting register can set the normal display mode or the partial non-display mode for each block of the scanning lines. Setting the partial display area in units of blocks prevents occurrence of various problems such as a shift of a display image or reduction of the number of scanning lines in each block caused by the difference between the number of the drawing rows and the number of the scanning lines in an actual display area of the display panel. This enables the partial display function to be implemented in units of blocks including the optimum number of scanning lines, whereby a display driver which efficiently utilizes resources such as memory capacity can be provided.

The display driver may further comprise a drawing row counter which increments a drawing row counter value based on a horizontal synchronization signal which defines a horizontal scanning period, wherein the drawing rows including the front drawing row are determined by using the drawing row counter value.

The display driver may further comprise:

a back porch counter which resets a back porch counter value based on a vertical synchronization signal which defines a vertical scanning period, and increments the back porch counter value based on the horizontal synchronization signal; and a comparator which compares a value set by the front drawing row designation register with the back porch counter value, wherein the drawing row counter resets the drawing row counter value by using a back porch finish signal, and increments the drawing row counter value based on the horizontal synchronization signal, the back porch finish signal being generated based on a signal which is output when the value set by the front drawing row designation register coincides with the back porch counter value.

Since the drawing rows starting from the front drawing row are variably set and can be determined by the counter, a display driver which is controlled by a general-purpose controller and has a horizontal partial display function by recognizing the drawing rows depending on a display panel can be provided with simple configuration.

In this display driver, the partial non-display voltage may be a voltage based on a most significant bit of the gray-scale data.

A voltage corresponding to a most significant bit of the gray-scale data is supplied to the data lines in a select period of the scanning lines set to the partial non-display mode. This enables to simplify an additional circuit for generating the partial non-display voltage, providing a display driver which implements reduction of power consumption.

According to one embodiment of the present invention, there is provided a display device comprising:

a plurality of scanning lines arranged in rows;

a plurality of data lines arranged in columns and intersecting the scanning lines;

a plurality of pixels, any of the above described display drivers which drives the data lines; and a scanning driver which scans the scanning lines.

According to another embodiment of the present invention, there is provided a display device comprising:

a display panel which includes a plurality of scanning lines arranged in rows, a plurality of data lines arranged in columns and intersecting the scanning lines, and a plurality of pixels;

any of the above described display drivers which drives the data lines, and a scanning driver which scans the scanning lines.

A display device preventing a shift of a display image and controlling the display by using a general-purpose controller can be thus provided.

According to a further embodiment of the present invention, there is provided a display drive method which drives a plurality of data lines arranged in columns, the data lines intersecting a plurality of scanning lines arranged in rows, and the display driver comprising:

designating one of the scanning lines as a front drawing row;

driving at least one of the data lines by using an operational amplifier section based on a drive voltage, in a select period of the scanning lines, when part of the scanning lines which are drawing rows including the front drawing row are set to a normal display mode; and limiting or stopping an operating current of the operational amplifier section, and driving at least one of the data lines by using a partial non-display voltage output section based on a partial non-display voltage, in a select period of the scanning lines, when part of the scanning lines which are the drawing rows are set to a partial non-display mode.

In this display drive method, each of a plurality of blocks into which the scanning lines are divided may be set to one of the normal display mode and the partial non-display mode;

when one of the blocks having part of the scanning lines which are drawing rows including the front drawing row is set to the normal display mode, the operational amplifier section may drive at least one of the data lines based on the drive voltage, in a select period of the scanning lines; and when one of the blocks having part of the scanning lines which are the drawing rows is set to the partial non-display mode, the operational amplifier section may limit or stop an operating current, and the partial non-display voltage output section may drive at least one of the data lines based on the partial non-display voltage, in a select period of the scanning lines.

In this display drive method, drawing rows including the front drawing row may be determined by using a drawing row counter value which is incremented based on a horizontal synchronization signal which defines a horizontal scanning period.

The display drive method may further comprise:

resetting a back porch counter value based on a vertical synchronization signal which defines a vertical scanning period, and incrementing the back porch counter value based on the horizontal synchronization signal;

comparing a value set by the front drawing row designation register with the back porch counter value; and resetting the drawing row counter value by using a back porch finish signal, and incrementing the drawing row counter value based on the horizontal synchronization signal, the back porch finish signal being generated based on a signal which is output when the value set by the front drawing row designation register coincides with the back porch counter value.

In the display drive method, the partial non-display voltage may be a voltage based on a most significant bit of the gray-scale data.

What is claimed is:

1. A display driver which drives a plurality of data lines arranged in columns and has a configuration in which a front drawing row can be designated, the data lines intersecting a plurality of scanning lines arranged in rows, and the display driver comprising:

a front drawing row designation register which designates any one of the scanning lines as the front drawing row;

a partial mode setting register which sets for the scanning lines either a normal display mode in which a drive voltage depending on gray-scale data is supplied to at least one of the data lines, or a partial non-display mode in which a partial non-display voltage is supplied to at least one of the data lines;

a data line driver circuit including an operational amplifier section which drives at least one of the data lines based on the drive voltage, and a partial non-display voltage output section which drives at least one of the data lines based on the partial non-display voltage; and a partial display control section which controls driving of the data line driver circuit, wherein the partial display control section starts counting the drawing rows after a period corresponding to a value set in the front drawing designation register has elapsed in a vertical scanning period;

wherein, when part of the scanning lines which are drawing rows including the front drawing row are set to the normal display mode, the partial display control section drives at least one of the data lines by using the operational amplifier section based on the drive voltage, in a select period of the scanning lines; and wherein, when part of the scanning lines which are the drawing rows are set to the partial non-display mode, the partial display control section limits or stops an operating current of the operational amplifier section, and drives at least one of the data lines by using the partial non-display voltage output section based on the partial non-display voltage, in a select period of the scanning lines.

2. The display driver as defined in claim 1, wherein:

the partial mode setting register sets each of a plurality of blocks into which the scanning lines are divided, to one of the normal display mode and the partial non-display mode;

when one of the blocks having part of the scanning lines which are drawing rows including the front drawing row is set to the normal display mode, the partial display control section drives at least one of the data lines by using the operational amplifier section based on the drive voltage, in a select period of the scanning lines; and when one of the blocks having part of the scanning lines which are the drawing rows is set to the partial non-display mode, the partial display control section limits or stops an operating current of the operational amplifier section, and drives at least one of the data lines by using the partial non-display voltage output section based on the partial non-display voltage, in a select period of the scanning lines.

3. The display driver as defined in claim 2, wherein the partial non-display voltage is a voltage based on a most significant bit of the gray-scale data.

4. The display driver as defined in claim 2, further comprising:

a drawing row counter which increments a drawing row counter value based on a horizontal synchronization signal which defines a horizontal scanning period, wherein the drawing rows including the front drawing row are determined by using the drawing row counter value.

5. The display driver as defined in claim 4, wherein the partial non-display voltage is a voltage based on a most significant bit of the gray-scale data.

6. The display driver as defined in claim 4, further comprising:

a back porch counter which resets a back porch counter value based on a vertical synchronization signal which defines a vertical scanning period, and increments the back porch counter value based on the horizontal synchronization signal; and a comparator which compares a value set by the front drawing row designation register with the back porch counter value, wherein the drawing row counter resets the drawing row counter value by using a back porch finish signal, and increments the drawing row counter value based on the horizontal synchronization signal, the back porch finish signal being generated based on a signal which is output when the value set by the front drawing row designation register coincides with the back porch counter value.

7. The display driver as defined in claim 6, wherein the partial non-display voltage is a voltage based on a most significant bit of the gray-scale data.

8. The display driver as defined in claim 1, further comprising:

a drawing row counter which increments a drawing row counter value based on a horizontal synchronization signal which defines a horizontal scanning period, wherein the drawing rows including the front drawing row are determined by using the drawing row counter value.

9. The display driver as defined in claim 8, wherein the partial non-display voltage is a voltage based on a most significant bit of the gray-scale data.

10. The display driver as defined in claim 8, further comprising:

a back porch counter which resets a back porch counter value based on a vertical synchronization signal which defines a vertical scanning period, and increments the back porch counter value based on the horizontal synchronization signal; and a comparator which compares a value set by the front drawing row designation register with the back porch counter value, wherein the drawing row counter resets the drawing row counter value by using a back porch finish signal, and increments the drawing row counter value based on the horizontal synchronization signal, the back porch finish signal being generated based on a signal which is output when the value set by the front drawing row designation register coincides with the back porch counter value.

11. The display driver as defined in claim 10, wherein the partial non-display voltage is a voltage based on a most significant bit of the gray-scale data.

12. The display driver as defined in claim 1, wherein the partial non-display voltage is a voltage based on a most significant bit of the gray-scale data.

13. A display device comprising:

a plurality of scanning lines arranged in rows;

a plurality of data lines arranged in columns and intersecting the scanning lines;

a plurality of pixels, the display driver as defined in claim 1 which drives the data lines; and a scanning driver which scans the scanning lines.

14. A display device comprising:

a display panel which includes a plurality of scanning lines arranged in rows, a plurality of data lines arranged in columns and intersecting the scanning lines, and a plurality of pixels;

the display driver as defined in claim 1 which drives the data lines, and a scanning driver which scans the scanning lines.

15. A display drive method which drives a plurality of data lines arranged in columns, the data lines intersecting a plurality of scanning lines arranged in rows, and the method comprising:

designating any one of the scanning lines as a front drawing row by setting a value in a front drawing designation register;

starting counting drawing rows after a period corresponding to a value set in the front drawing designation register has elapsed in a vertical scanning period;

driving at least one of the data lines by using an operational amplifier section based on a drive voltage, in a select period of the scanning lines, when part of the scanning lines which are drawing rows including the front drawing row are set to a normal display mode; and limiting or stopping an operating current of the operational amplifier section, and driving at least one of the data lines by using a partial non-display voltage output section based on a partial non-display voltage, in a select period of the scanning lines, when part of the scanning lines which are the drawing rows are set to a partial non-display mode.

16. The display drive method as defined in claim 15, wherein:

each of a plurality of blocks into which the scanning lines are divided is set to one of the normal display mode and the partial non-display mode;

when one of the blocks having part of the scanning lines which are drawing rows including the front drawing row is set to the normal display mode, the operational amplifier section drives at least one of the data lines based on the drive voltage, in a select period of the scanning lines; and when one of the blocks having part of the scanning lines which are the drawing rows is set to the partial non-display mode, the operational amplifier section limits or stops an operating current, and the partial non-display voltage output section drives at least one of the data lines based on the partial non-display voltage, in a select period of the scanning lines.

17. The display drive method as defined in claim 16, wherein the partial non-display voltage is a voltage based on a most significant bit of the gray-scale data.

18. The display drive method as defined in claim 16, wherein part of the scanning lines which are the drawing rows including the front drawing row are determined by using a drawing row counter value which is incremented based on a horizontal synchronization signal which defines a horizontal scanning period.

19. The display drive method as defined in claim 18, wherein the partial non-display voltage is a voltage based on a most significant bit of the gray-scale data.

20. The display drive method as defined in claim 18, further comprising:

resetting a back porch counter value based on a vertical synchronization signal which defines a vertical scanning period, and incrementing the back porch counter value based on the horizontal synchronization signal;

comparing a value set by the front drawing row designation register with the back porch counter value; and resetting the drawing row counter value by using a back porch finish signal, and incrementing the drawing row counter value based on the horizontal synchronization signal, the back porch finish signal being generated based on a signal which is output when the value set by the front drawing row designation register coincides with the back porch counter value.

21. The display drive method as defined in claim 20, wherein the partial non-display voltage is a voltage based on a most significant bit of the gray-scale data.

22. The display drive method as defined in claim 15, wherein the drawing rows including the front drawing row are determined by using a drawing row counter value which is incremented based on a horizontal synchronization signal which defines a horizontal scanning period.

23. The display drive method as defined in claim 22, wherein the partial non-display voltage is a voltage based on a most significant bit of the gray-scale data.

24. The display drive method as defined in claim 17, further comprising:

resetting a back porch counter value based on a vertical synchronization signal which defines a vertical scanning period, and incrementing the back porch counter value based on the horizontal synchronization signal;

comparing a value set by the front drawing row designation register with the back porch counter value; and resetting the drawing row counter value by using a back porch finish signal, and incrementing the drawing row counter value based on the horizontal synchronization signal, the back porch finish signal being generated based on a signal which is output when the value set by the front drawing row designation register coincides with the back porch counter value.

25. The display drive method as defined in claim 24, wherein the partial non-display voltage is a voltage based on a most significant bit of the gray-scale data.

26. The display drive method as defined in claim 15, wherein the partial non-display voltage is a voltage based on a most significant bit of the gray-scale data.

* * * * *